(12) United States Patent
Garza

(10) Patent No.: US 10,458,451 B1
(45) Date of Patent: Oct. 29, 2019

(54) DISPLAY CLIP AND OBJECT MOUNTING SYSTEM

(71) Applicant: Ubaldo Garza, Porterville, CA (US)

(72) Inventor: Ubaldo Garza, Porterville, CA (US)

(*) Notice: Subject to any disclaimer, the term of this patent is extended or adjusted under 35 U.S.C. 154(b) by 0 days.

(21) Appl. No.: 16/228,654

(22) Filed: Dec. 20, 2018

Related U.S. Application Data

(63) Continuation-in-part of application No. 15/472,568, filed on Mar. 29, 2017, now abandoned.

(51) Int. Cl.
| | | |
|---|---|---|
| *F16B 2/22* | (2006.01) | |
| *G09F 21/04* | (2006.01) | |
| *G09F 17/00* | (2006.01) | |
| *B60R 11/00* | (2006.01) | |
| *F16M 13/02* | (2006.01) | |

(52) U.S. Cl.
CPC .............. *F16B 2/22* (2013.01); *G09F 21/048* (2013.01); *B60R 11/00* (2013.01); *B60R 2011/004* (2013.01); *B60R 2011/0059* (2013.01); *B60R 2011/0071* (2013.01); *F16M 13/02* (2013.01); *G09F 17/00* (2013.01)

(58) Field of Classification Search
CPC .......... F16B 2/22; G09F 21/048; G09F 17/00; B60R 2011/004; B60R 2011/0059; B60R 2011/0071
See application file for complete search history.

(56) References Cited

U.S. PATENT DOCUMENTS

| | | | | |
|---|---|---|---|---|
| 3,461,584 A | * | 8/1969 | Wilson | G09F 21/04 40/591 |
| 4,021,948 A | * | 5/1977 | Mosch | G09F 17/00 40/591 |
| 4,628,624 A | * | 12/1986 | Gunn | G09F 21/048 40/590 |
| 5,031,268 A | * | 7/1991 | McCabe | F16B 21/088 16/2.1 |
| 5,076,196 A | * | 12/1991 | Chan | B60Q 1/50 116/28 R |
| 5,255,464 A | * | 10/1993 | Marecek | G09F 21/048 40/588 |
| 5,398,437 A | * | 3/1995 | Bump, Jr. | B60Q 1/50 116/173 |
| 5,463,974 A | * | 11/1995 | Seeder | G09F 7/18 116/173 |

(Continued)

*Primary Examiner* — Gary C Hoge
(74) *Attorney, Agent, or Firm* — Richard A. Ryan

(57) ABSTRACT

A display clip and mounting system for securely mounting an object to a surface having outwardly extending edge. The display clip has a section that engages the outwardly extending edge and a section that engages the object to hold the object to the display clip. The edge engaging section has a base with a hook that engages the outwardly extending edge. The object engaging section has an engaging member with an outwardly projecting member that extends generally perpendicularly from a back panel, an engaging cap that engages the projecting member and a mounting strap that connects the cap to the projecting member. The cap tightly engages the projecting member to prevent inadvertent unlocking of the display clip. The base has a plurality of interconnected positioning apertures that receive the projecting member to allow the user to adjust the location of the projecting member for different sizes of objects and surfaces.

20 Claims, 13 Drawing Sheets

(56) References Cited

U.S. PATENT DOCUMENTS

| | | | |
|---|---|---|---|
| 2004/0128884 A1* | 7/2004 | McCambley, Jr. | B60R 13/00 40/591 |
| 2005/0217557 A1* | 10/2005 | Caetano | G09F 17/00 116/28 R |
| 2005/0263060 A1* | 12/2005 | Armstrong | B60R 13/00 116/28 R |
| 2008/0251666 A1* | 10/2008 | Long | B60R 11/00 248/208 |
| 2015/0059133 A1* | 3/2015 | Hirakawa | F16B 2/20 24/458 |
| 2015/0115009 A1* | 4/2015 | Stauber | B60R 11/02 224/275 |
| 2015/0322985 A1* | 11/2015 | Scroggie | F16B 19/008 29/428 |
| 2016/0114739 A1* | 4/2016 | Korber | F16B 21/075 24/292 |
| 2016/0338501 A1* | 11/2016 | Conway | F16B 2/22 |
| 2017/0208888 A1* | 7/2017 | Volmer | A42B 1/24 |
| 2017/0349117 A1* | 12/2017 | Mingerink | F16B 21/075 |
| 2018/0179780 A1* | 6/2018 | Dershem | E04H 15/644 |
| 2018/0180076 A1* | 6/2018 | Betancourt Santana | B60R 13/00 |
| 2018/0325248 A1* | 11/2018 | Tedder | A45F 5/021 |
| 2018/0339665 A1* | 11/2018 | Diep | F16B 5/128 |
| 2019/0016277 A1* | 1/2019 | Dallos, Jr. | B60R 13/04 |
| 2019/0039661 A1* | 2/2019 | Lee | B62D 27/06 |
| 2019/0078596 A1* | 3/2019 | Yoyasu | F16B 5/0635 |
| 2019/0139461 A1* | 5/2019 | Lester | G09F 7/18 |

* cited by examiner

DISPLAY CLIP AND OBJECT MOUNTING SYSTEM

CROSS-REFERENCE TO RELATED APPLICATIONS

This patent application is a continuation-in-part of U.S. patent application Ser. No. 15/472,568 filed Mar. 29, 2017.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to devices and systems that are specially configured to securely mount an object on a surface. In particular, the present invention relates to display devices and mounting systems that are structured and arranged to removably, but securely, mount an object on a surface that has an outwardly extending edge that can be utilized by the display device. Even more particularly, the present invention relates to display devices and mounting systems that can be utilized to securely mount an object having one or more mounting apertures to a surface having an outwardly extending edge.

B. Background

Many people hang, attach or otherwise mount an object on a surface so the object may be displayed in a manner in which other persons will see, and in certain circumstances, take action based on the object or material that is contained on the object. Objects that are mounted on a surface for display of the object may take many different forms and be utilized for a wide variety of different purposes. As an example, advertising panels or display boards are frequently mounted on a vertical wall or other vertical or near-vertical surface so that persons who pass by the location will see the advertisement and, hopefully, purchase the item, engage the service or attend the event being promoted by the advertisement. Advertising panels or other information display boards are frequently mounted to a generally vertical surface of a motor vehicle, such as a door, side wall of a van or panel truck or the tailgate of a pickup truck so that persons who are alongside or behind the vehicle will see the advertisement or information. Announcements and like notices are frequently mounted on a wall, door, blackboard, whiteboard, window or other surface so that the intended person or persons, such as employees, students and the like, will see the announcement or notice and take action, or not take action, based on the information contained in the announcement or notice. In addition to the foregoing, objects may be mounted on a wall or other surface to store or otherwise keep the object off the floor and out of the person's way.

A common form for objects that are mounted on a surface, particularly vertical surfaces such as walls, doors, vehicle surfaces and the like, is as a flat or generally flat panel or board which has a front surface that is intended for viewing by persons and a back surface which is at or even against the surface. While some display panels or boards (or other objects) are intended to be permanently or at least fixedly attached to the surface, the vast majority of display panels or boards are intended to be utilized for a relatively short, but often fixed, or indeterminate amount of time to advertise or promote a product, service or event and then to be replaced with a new display panel or board that updates the advertising/promotion campaign or advertises/promotes a new product, service or event. Display objects that are intended to be fixedly attached to the surface can be done so using nails, screws, rivets, adhesives, welding or the like, depending on the material used for the object, that make it relatively difficult for the display object to fall off of the surface and for other persons to remove the object from the surface.

As well known in the art, there are many types of mounting devices that are configured to temporarily attach an object to a surface. Some mounting devices are configured to take advantage of the material composition of the object. For instance, depending on the make-up of the object, magnets, sticky or gummy materials and the like can be utilized to temporarily attach the object to the surface. Other mounting devices are selected so as to be cooperatively configured with the display object to allow the object to be easily attached to the surface and then, when desired, removed from the surface. In one example, the mounting device is configured to engage a component of the object, whether integral to the object or attached to the object, to support the object on the surface. In another example, the mounting device may be configured to engage the corners and/or a peripheral edge of the object to support the object on the surface. In other configurations, an object may have a bracket that is configured to engage a nail, screw or other item that is secured to and protrudes from the surface to support the object on the surface.

One particular example of use of an object that is displayed to advertise a product or service, to promote an event or to show solidarity with a political position or politician is to mount a panel or display board to the surface of a vehicle, such as the back or outer surface of a pickup tailgate. As generally well known, the back surface of the tailgate makes a good platform to display information, of any type, for others to see. Many people prefer a removable panel or display board because, unlike a wrap or sticker, the panel or board can be removed when the user of the vehicle does not wish to display the information or when he or she desires to change the information being displayed. The use of attachment mechanisms such as screws, bolts and the like require alteration of the vehicle, which alterations remain after the panel or board is removed. Presently, when removably displaying an object on a tailgate, most persons utilize a magnet or a magnetic display that magnetically engages the outer surface of the tailgate. Unfortunately, it is relatively common for the magnet to become disengaged from the tailgate if the vehicle is driven over a rough road and for the magnet to scratch or otherwise damage the surface of the tailgate.

What is needed therefore, is an improved mounting device that can be utilized to mount an object to a surface. More specifically, what is needed is a new mounting device that can securely, but removably, mount an object to a surface so the object may be seen or be positioned out of the way. The new mounting device should be configured to securely and removably mount a wide variety of objects to a wide variety of different types of surfaces. The new mounting device should be configured to securely and removably engage the surface, or a component thereof, in a manner which allows the user to temporarily display an object. In one use, the new mounting device of the present invention should be configured to mount a panel or display board to a vertical or substantially vertical surface so that the information on the outwardly facing side of the panel or board can be seen by others to promote a product, service or event. The new mounting device should be particularly useful for securely but removably mounting an object on a wall or on an outwardly facing surface of a vehicle, such as a pickup truck tailgate. Preferably, the new mounting device should be configured to be easy to use and relatively inexpensive to manufacture.

SUMMARY OF THE INVENTION

The new display clip and object mounting system of the present invention provides the benefits and solves the problems identified above. That is to say, the new display clip and object mounting system of the present invention are structured and arranged to securely, but removably, mount an object to a surface so the object may be seen by the user and/or others or to position the object out of the user's way. In the preferred embodiments of the present invention, the new mounting device and system are configured to securely and removably mount a wide variety of objects to surfaces that have or which may be provided with an outwardly extending edge that is engaged by the display clip to support the object on the surface. The new mounting device and system of the present invention are configured to securely and removably engage the edge in a manner which allows the user to temporarily and securely display an object on the surface. In one use, the new mounting device of the present invention can be utilized to mount a panel or display board to an outwardly extending edge on or otherwise associated with a substantially vertical surface so that the information on the outwardly facing side of the panel or board can be seen by others to promote a product, service or event. The new mounting device and system are particularly useful for securely, but removably, mounting a display panel or board that promotes a product, service, event or the like on the outwardly facing surface of a vehicle, such as a pickup truck tailgate, that has an outwardly extending edge at which the display clip is mounted and against which the display clip is held in place. In one configuration, the new display clip has an elongated base with a plurality of base apertures that allow the user to beneficially locate the object engaging section on the base to better position the object on a surface. In the preferred embodiments, the new display clip and mounting system of the present invention are easy to use and relatively inexpensive to manufacture.

In one embodiment of the display clip of the present invention, which is utilized for mounting an object having a mounting aperture to a surface having an outwardly extending edge, the new display clip generally comprises an edge engaging section and an object engaging section. The edge engaging section has a base and a hook. The base has a front surface and a back surface and the hook is attached to or integral with the base so as to extend outwardly from the base to define an edge engaging gap that is sized and configured so the hook can be positioned over the outwardly extending edge of the surface with the back surface of the base at or against the surface. The object engaging section has an outwardly projecting member and an engaging cap, with the outwardly projecting member having a proximal end that is attached to or integral with the base of the edge engaging section. The outwardly projecting member extends outward, typically in a generally perpendicular manner, from the base so as to dispose a distal end of the outwardly projecting member in spaced apart relation to the front surface of the base. The outwardly projecting member is sized and configured to pass through the mounting aperture of the object. The engaging cap is structured and arranged to removably engage at least one of the base and the outwardly engaging member to place the display clip in a locked position with the engaging cap in spaced apart relation to the front surface of the base. The object engaging section is configured to support the object on the surface when the hook is over the outwardly extending edge associated with the surface and the display clip is in its locked position with the mounting aperture of the object disposed between the base and the engaging cap, thereby placing the back surface of the base generally at or against the surface.

In one of the preferred configurations, the object engaging section further comprises a mounting strap having a flexible elongated body with a first end attached to or integral with the edge engaging section and a second end attached to or integral with the engaging cap. The mounting strap has a strap base with a base aperture therethrough. The strap base is sized and configured to be placed over the outwardly projecting member. The outwardly extending member extends through the base aperture to position the distal end thereof in spaced apart relation to the strap base so as to attach the mounting strap to the edge engaging section. The engaging cap has a cap aperture that is sized and configured to receive the outwardly projecting member therethrough so as to position the distal end of the outwardly projecting member in spaced apart relation to the engaging cap when the display clip is in the locked position. In a preferred configuration, the outwardly projecting member has an enlarged section at or near its distal end. The enlarged section is cooperatively sized and configured with the engaging cap to secure the engaging cap to the outwardly projecting member. The outwardly projecting member has a narrower section at or near the proximal end thereof, with the narrower section sized and configured to receive the cap aperture of the engaging cap after the enlarged section of the outwardly projecting member has passed through the cap aperture.

Preferably, the enlarged section is cooperatively sized and configured with the cap aperture to prevent the display clip from inadvertently moving to an unlocked position that has the engaging cap disengaged from the outwardly projecting member, which could result in the object falling off of the surface. In one configuration, the enlarged section is bulbous and the cap aperture is round. To help secure the engaging cap to the outwardly projecting member, the engaging cap further comprises an inwardly projecting lip that is associated with the cap aperture. The inwardly projecting lip is sized and configured to reduce the size of the cap aperture so as to tightly engage the enlarged section when positioning the display clip in its locked condition and to prevent the display clip from inadvertently moving to its unlocked position.

In one use, the hook of the display clip has a curved member, the surface is on a vehicle, the vehicle has a gap associated with the outwardly extending edge of the surface and the surface is moveable between an open condition and a closed condition. In one embodiment the surface is a tailgate, door or window. The curved member is sized and configured to be positioned at the outwardly extending edge of the surface when the surface is in its open position and to be received in the gap so as to secure the display clip to the vehicle when the surface is in its closed condition to position the object on the vehicle with a back side of the object generally at or against the surface and a front side of the object facing away from the vehicle when the display clip is in the locked position. This use could be particularly beneficial for use with a display panel, as the object, having promotional information on the outward facing side of the panel.

In one embodiment of the system of the present invention, the new mounting system generally comprises an object having a mounting aperture, a surface having an outwardly extending edge, and a display clip for connecting to the mounting aperture to mount the object to the outwardly extending edge of the surface. The display clip has an edge engaging section and an object engaging section, such as described above. In one embodiment of the system, the system also has a vehicle with a gap associated with the outwardly extending edge of the surface, with the surface being moveable between an open condition and a closed condition. In this embodiment, the hook of the edge engaging section has a curved member that is sized and configured to be positioned at the outwardly extending edge when the surface is in an open position and to be received in the gap so as to secure the display clip to the vehicle when the surface is in the closed condition to position the object on the vehicle with a back side of the object generally at or against the surface with a front side of the object facing away from the vehicle when the display clip is in the locked position. In another embodiment of the new system, the surface is a tailgate and the gap is disposed between the tailgate and a back wall of the vehicle when the tailgate is in the closed condition. In this embodiment, the display clip is configured to position the object at a rearward facing side of the tailgate so as to dispose a front side of the object generally rearward of the vehicle.

In an alternative embodiment of the display clip and object mounting system of the present invention, the edge engaging section and object engaging section of the display clip are configured to allow the user to adjust the positioning of the object relative to the outwardly extending edge of the surface against which the object will be positioned. In this embodiment, the edge engaging section has an elongated base having a first or upper end and a second or lower end, with the hook being attached to or integral with the first/upper end. As described above, the base has a front surface and a back surface and the hook extends outwardly from the base to define an edge engaging gap that is sized and configured so the hook can be positioned over the outwardly extending edge of the surface with the back surface of the base at or against the surface. The elongated base has a plurality of positioning apertures that are each sized and configured for the outwardly projecting member of a modified object engaging section, which is separate from the base, to pass therethrough. In a preferred configuration of this embodiment, each positioning aperture is joined to an adjacent positioning aperture by a connecting slot that allows the user to easily move the object engaging section up and down the base between positioning apertures. The multiple positioning apertures allow the user to select the preferred positioning aperture that aligns with the mounting aperture of the object, which will depend on the size of the object and/or the location of the outwardly extending edge relative to the object, so the new display clip and system can be utilized with different sizes of object and to better position the object where he or she desire.

The object engaging section of the alternative embodiment has an engaging member and an engaging cap, with the engaging member having an outwardly projecting member with a proximal end that is attached to or integral with an enlarged back panel (instead of the base of the edge engaging section) to be a separate component from the edge engaging section. The outwardly projecting member extends outward from the back panel, typically generally perpendicular, to dispose its distal end in spaced apart relation to the back panel. As described above, the engaging cap has a cap aperture therethrough and is attached to or integral with a mounting strap having a strap base with a base aperture that is sized and configured to be engaged by the outwardly projecting member. The outwardly projecting member has an enlarged section that is sized and configured to pass through the positioning aperture of the base, the mounting aperture of the object and the base aperture of the strap base to be engaged by the engaging cap in order to place the display clip in its locked position with the engaging cap in spaced apart relation to the front surface of the base, with the front surface of the back panel placed against the back surface of the base. As with the above embodiments, the object engaging section is configured to support the object on the surface when the hook is over the outwardly extending edge associated with the surface and the display clip is in its locked position with the mounting aperture of the object disposed between the base and the engaging cap, thereby placing the back surface of the base generally at or against the surface on which the object is to be mounted (i.e., tailgate, wall or the like).

Accordingly, the primary object of the present invention is to provide a new display clip and mounting system that has the advantages set forth above and which overcomes the various disadvantages and limitations which are associated with presently available mounting devices and systems.

It is an important object of the present invention to provide a new display clip and mounting system that is beneficially structured and arranged to be utilized with a wide range of different types and sizes of objects to securely but removably mount an object to a surface.

An important aspect of the present invention is that it provides a new display clip and mounting system that accomplishes the objectives set forth above and elsewhere in the present disclosure.

Another important aspect of the present invention is that it provides a new display clip and mounting system that is structured and arranged to be utilized to securely and removably mount an object to a surface.

Another important aspect of the present invention is that it provides a new display clip and mounting system that is structured and arranged to securely, but removably, mount an object to a surface so the object may be seen by the user and/or others or to position an object out of the user's way.

Another important aspect of the present invention is that it provides a new display clip and mounting system that are specially configured to securely and removably mount an object to a surface that has, or which may be provided with, an outwardly extending edge such that the edge is engaged by the display clip to support the object on the surface.

Another important aspect of the present invention is that it provides a new display clip and mounting system that can be utilized to mount a panel or display board to an outwardly extending edge on or otherwise associated with a substantially vertical surface so that the information on the outwardly facing side of the panel or board can be seen by others to promote a product, service or event.

Another important aspect of the present invention is that it provides a new display clip and mounting system that has an edge engaging section with an elongated mounting base having a plurality of positioning apertures to allow the user to beneficially position the object engaging section thereon to be able to be utilized with different sized objects and/or surfaces and to better position the object which is to be supported by the display clip on the surface.

Another important aspect of the present invention is that it provides a new display clip and mounting system that is particularly useful for securely, but removably, mounting a display panel or board that promotes a product, service, event or the like on the outwardly facing surface of a vehicle, such as a pickup truck tailgate, that has an edge on which the display clip is mounted and against which the display clip can be securely held in place.

Yet another important aspect of the present invention is that it provides a new display clip and mounting system which are easy to use and relatively inexpensive to manufacture.

As will be explained in greater detail by reference to the attached figures and the description of the preferred embodiment which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the new display clip of the present invention, as well as an example of an object and a surface with which the display clip may be utilized, those skilled in the art will readily appreciate that the present invention is not so limited. In addition, the exemplary embodiment of the present apparatus is shown and described herein with only those components that are required to disclose the present invention. As such, it may be possible that some of the necessary elements for attaching and using the present invention are not shown or necessarily described below, but which are well known to persons who are skilled in the relevant art. As will be readily appreciated by such persons, the various elements of the present invention that are described below may take on any form consistent with forms that are readily appreciated by a person of ordinary skill in the art having knowledge of mounting devices and objects which may be beneficially mounted on a surface.

Figure 1:
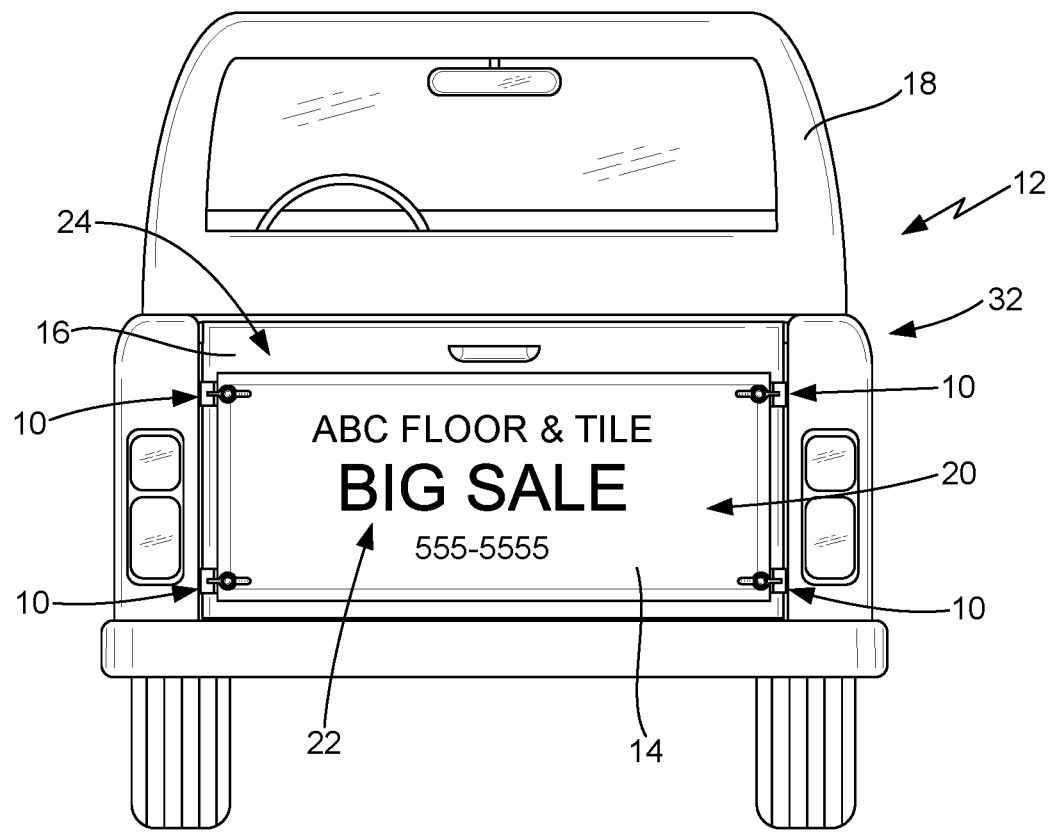
FIG. 1 is an illustrated view of the mounting system of the present invention showing the back view of a pickup truck having a display board that is attached to the rearwardly facing surface of a tailgate utilizing four display clips that are configured according to a first embodiment of the present invention, with the tailgate shown in its closed condition.
Figure 2:
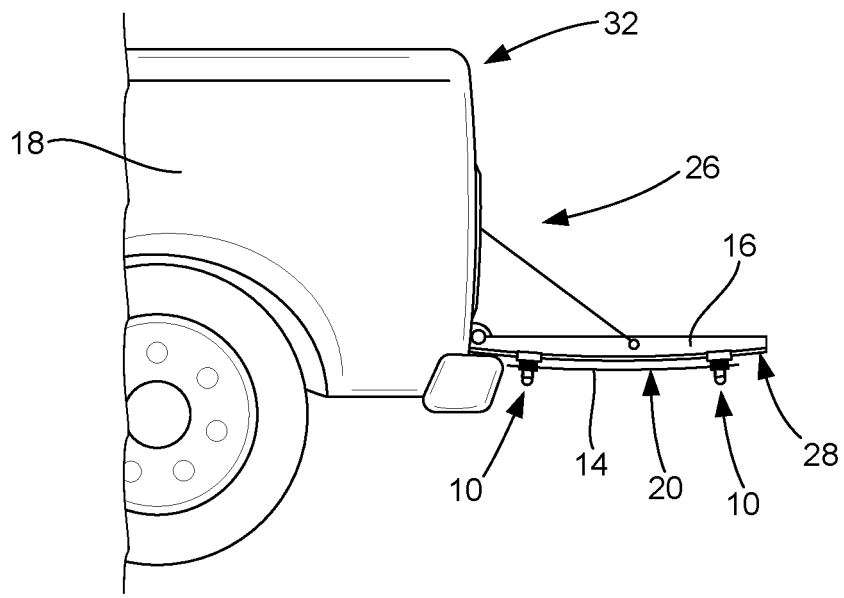
FIG. 2 is an illustrated view of the mounting system of FIG. 1 showing a side view of the pickup truck and tailgate, with the tailgate shown in its open condition with the display board mounted thereto.
Figure 3:
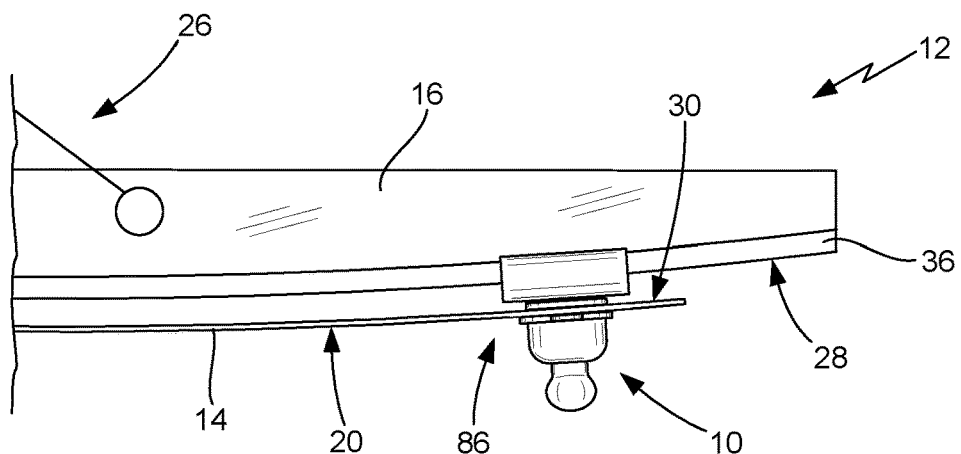
FIG. 3 is an illustrated view of the mounting system of FIG. 1 showing an enlarged view of a portion of the tailgate, display board and display clip to better show the outwardly extending edge of the tailgate.
Figure 4:
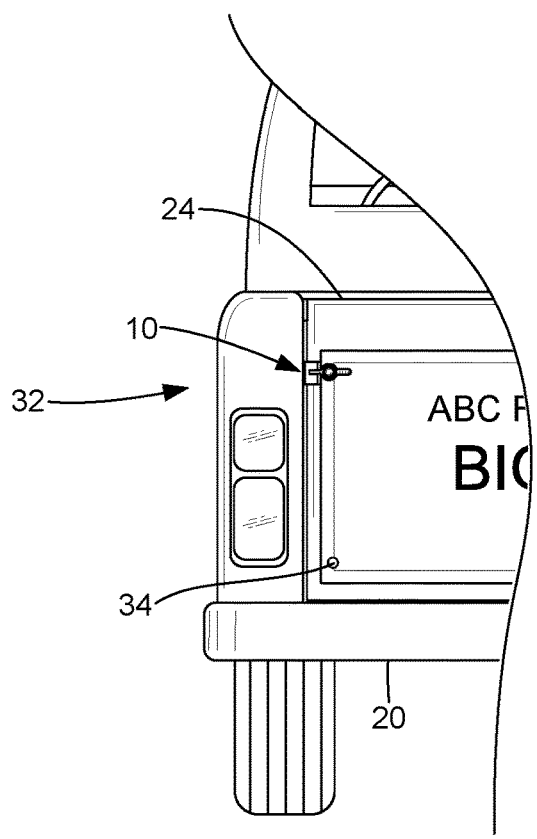
FIG. 4 is an illustrated view of the mounting system of FIG. 1 showing a back view of a portion of the pickup, tailgate, display board and display clip, with one display clip shown removed to show the mounting aperture in the display board.
Figure 5:
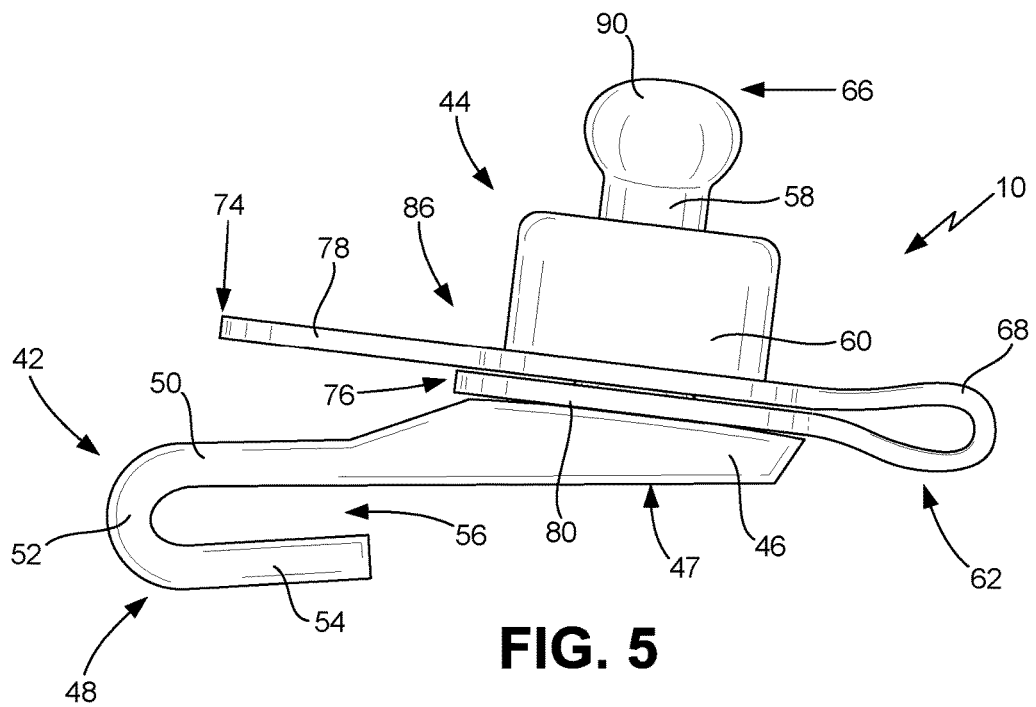
FIG. 5 is a side view of the display clip of FIG. 1, with the display clip shown in its locked position.
Figure 6:
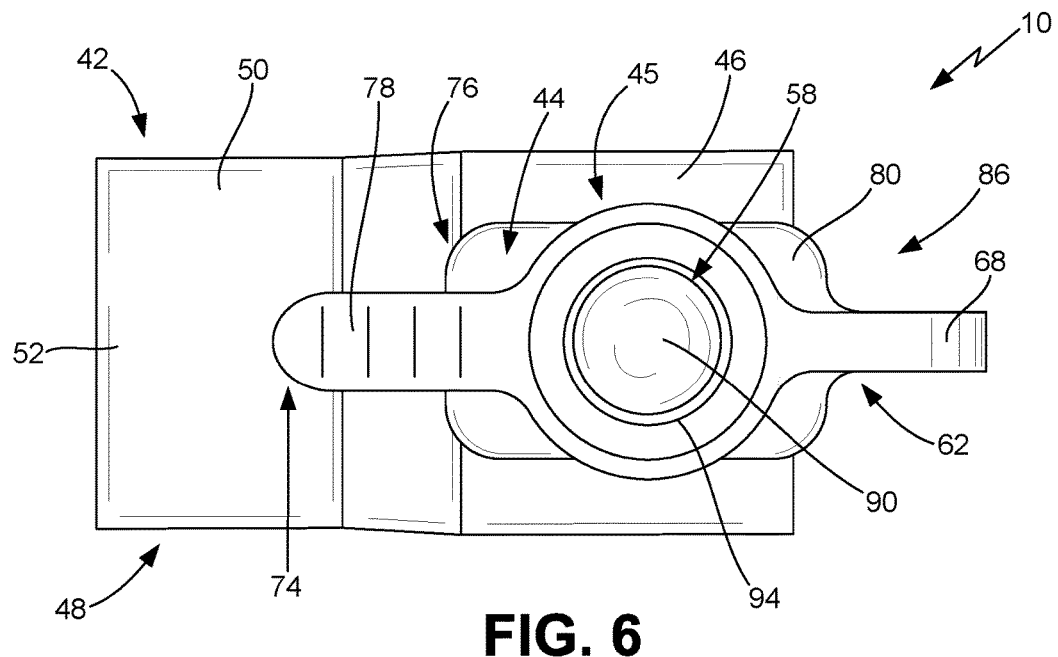
FIG. 6 is a front view of the display clip of FIG. 5.
Figure 7:
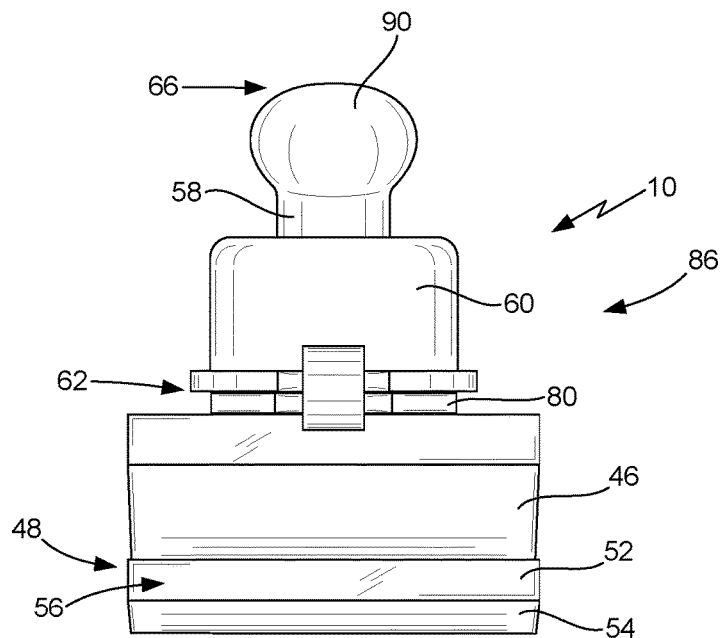
FIG. 7 is a right end view of the display clip of FIG. 5.
Figure 8:
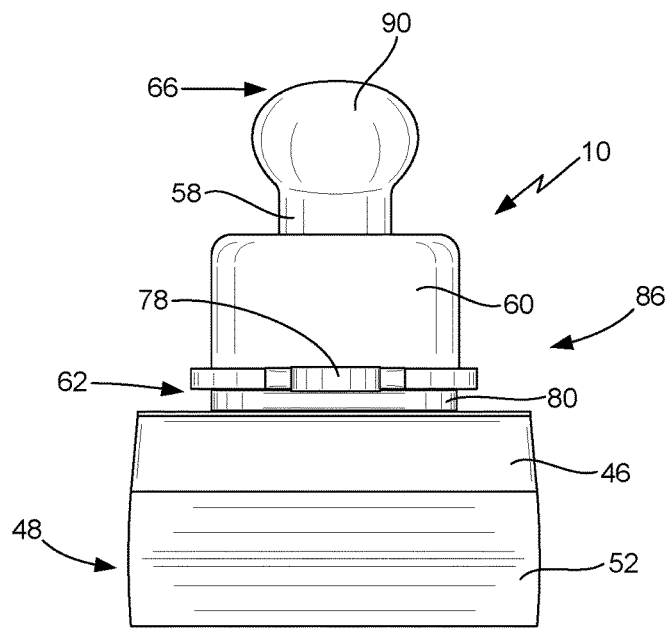
FIG. 8 is a left end view of the display clip of FIG. 5.

A display clip that is configured pursuant to one of the preferred embodiments of the present invention is referred to generally as 10 in FIGS. 1-14. A mounting system that utilizes the new display clip 10 is generally referred to as 12 in FIGS. 1-4, 13 and 15-17. As set forth in more detail below, the new display clip 10 of the present invention is structured and arranged to removably, but securely, mount an object 14 on a surface 16. In FIGS. 1-4, the object 14 is a display board and the surface 16 is the tailgate of a vehicle 18 (i.e., a pickup truck), with four of the display clips 10 being shown in use to mount the display board/object 14 to the tailgate/surface 16. The display board 14 has a front or display side 20 on which information 22, which may be advertising, promotional, political or other type of information that derives some benefit from being displayed, is provided so that the user and others can see and perhaps act on the information 22. In FIGS. 1 and 4, the tailgate 16 is shown in its closed condition 24, whereas in FIGS. 2 and 3 the tailgate 16 is shown in its open condition 26. The tailgate 16 has a rearward facing side 28, which faces rearward from the pickup truck 18. The back side 30 of the display board 14 is positioned against or generally near the rearward facing side 28 of the tailgate 16 when the display board 14 is mounted thereto so that persons behind or approaching from behind the pickup truck 18 will see the information 22 on the front side 20 of the display board 14. As will be readily understood, for purposes of the present invention, the term rearward that is utilized in reference to the pickup truck 18 is the direction facing away from the back end 32 of the pickup truck 18 where the tailgate 16 is located, as best shown in FIGS. 1, 2 and 3.

The display board 14 has a mounting aperture 34 through which is received a portion of the display clip 10 and the tailgate 16 has an outwardly extending edge 36 that is engaged by the display clip 10 to removably and securely hold the display board 14 on the pickup truck 18 in a manner which allows the user to display the information 22, as best shown in FIG. 4. The back end 32 of the pickup truck 18 has a back wall 38 that is substantially adjacent the outward extending edge 36 of the tailgate 16 when the tailgate 16 is in its closed condition 24, as shown in FIGS. 1 and 4. A gap 40 is formed between the back wall 38 and the edge 36 of the tailgate 16 when the tailgate 16 is in its closed condition 24, as best shown in FIG. 4. As also best shown in FIG. 4 and explained in more detail below, the portion of the display clip 10 that engages the outwardly extending edge 36 of the tailgate 16 is tightly received in the gap 40 to secure the display clip 10 to the tailgate 16 when the tailgate 16 is in its closed condition 24.

As will be readily appreciated by persons skilled in the art, the object 14 and the surface 16 may be different, even substantially different, than the display board and tailgate referenced above and shown in FIGS. 1-4. Although it is anticipated that the new display clip 10 and mounting system 12 of the present invention will be particularly useful for mounting a display board 14 to a tailgate 16 of a pickup truck 18, the present invention is not necessarily limited to this use. For instance, the object 14 may be virtually any object that can be mounted onto a surface 16 in the manner described below (namely utilizing an aperture 34, such as shown in FIG. 4, that is through or otherwise associated with the object 14) and the surface 16 may be a wall, door, window, or like, whether associated with a vehicle 18 or not, which is or can be configured as described below (namely having or being able to be provided with an outwardly extending edge 36) such that the new display clip 10 may engage the surface 16 to removably, but securely, hold the object 14 on the surface 16. Likewise, the vehicle 18 may be any type of vehicle that has a surface 16 with an outwardly extending edge 36, which may be integral with, attached to or otherwise associated with the surface 16. For instance, many SUVs and the like have a "tailgate" which opens and closes that may be able to be utilized as the surface 16 of the system 12 of the present invention. Other vehicles may have doors, windows or other components that can be utilized as surface 16.

The new display clip 10 generally comprises a first or edge engaging section 42 and a second or object engaging section 44 that engage, respectively, the outward extending edge 36 associated with the surface 16 (i.e., the tailgate) and the mounting aperture 34 of the object 14 (i.e., the display board). As set forth in more detail below, the edge engaging section 42 and object engaging section 44 are cooperatively structured and arranged so the display clip 10 can be securely held in place on the surface 16 and can securely hold the object 14 to the surface 16. Specifically, with regard to the embodiment where the new display clip 10 is utilized to secure a display board 14 (or related object) to the tailgate 16 of a pickup truck 18, the edge engaging section 42 is sized and configured be placed over the outwardly extending edge 36 of the tailgate 16 and to fit within the gap 40 between the back wall 38 and the tailgate 16 when the tailgate is in its closed condition 24 to tightly secure the display clip 10 to the pickup truck 18 so a portion of the object engaging section 44 can be received through the mounting aperture 34 of the display board 14 to secure the display board 14 to the tailgate 16 in the manner shown in FIGS. 1-4.

In the embodiment shown in the figures, the edge engaging section 42 of the display clip 10 generally comprises a base 46 and a hook 48 attached to or integral with the base 46 so as to extend outwardly from the base 46, as best shown in FIGS. 5-6 and 9-12. As shown in these figures, the hook 48 comprises a an outwardly disposed member 50, a curved member 52 and an inwardly disposed member 54 that define an edge engaging gap 56 between the outwardly disposed member 50 and the inwardly disposed member 52. In a preferred embodiment of the new display clip 10, the base 46 and hook 48 are integrally formed by molding the components from plastic or like materials, with the components of the hook 48, and the edge engaging gap 56 formed therefrom, being sized and configured to fit over the outwardly extending edge 36 associated with the surface 16 with which the display clip 10 is likely to be utilized (i.e., such as the edge 36 of the tailgate 16). In this embodiment, the thickness of hook 48 should be selected to fit within the gap 40 between the back wall 38 of the pickup truck 18 and the tailgate 14, as shown in FIGS. 1-4. In one configuration, the base 46 and the outwardly disposed member 50 have a combined length of approximately one and one-half inches to three inches and a width of approximately one-half to two inches, the inwardly disposed member 54 is approximately one-half to one inch and the edge engaging gap 56 is approximately one-eighth to three-eighths an inch wide. The above configuration of the edge engaging section 42 of the display clip 10 is provided for exemplary purposes only and is in no way intended to limit the scope of the present invention. As will be readily appreciated by those skilled in the art, the various components of the edge engaging section 42 may be made out of a wide variety of different materials and in a wide variety of different dimensions.

Figure 9:
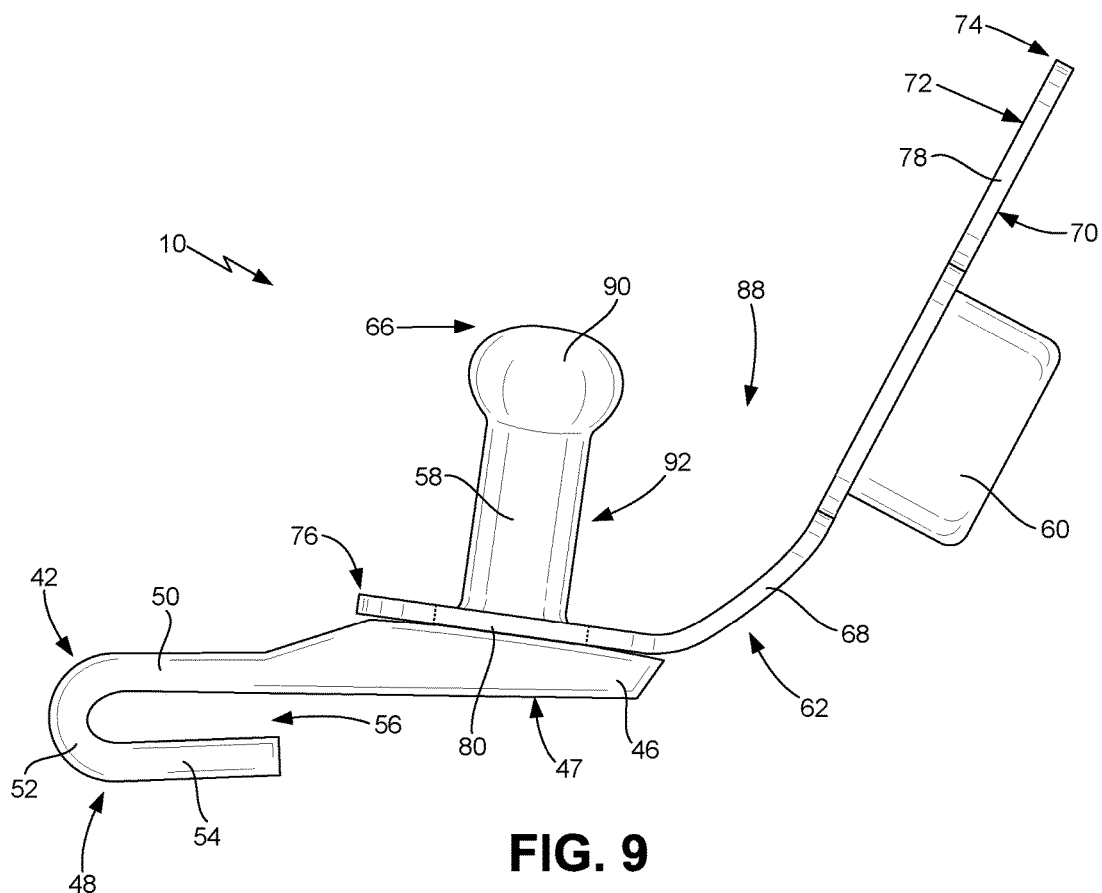
FIG. 9 is a side view of the display clip of FIG. 5, with the display clip shown in its unlocked position.
Figure 10:
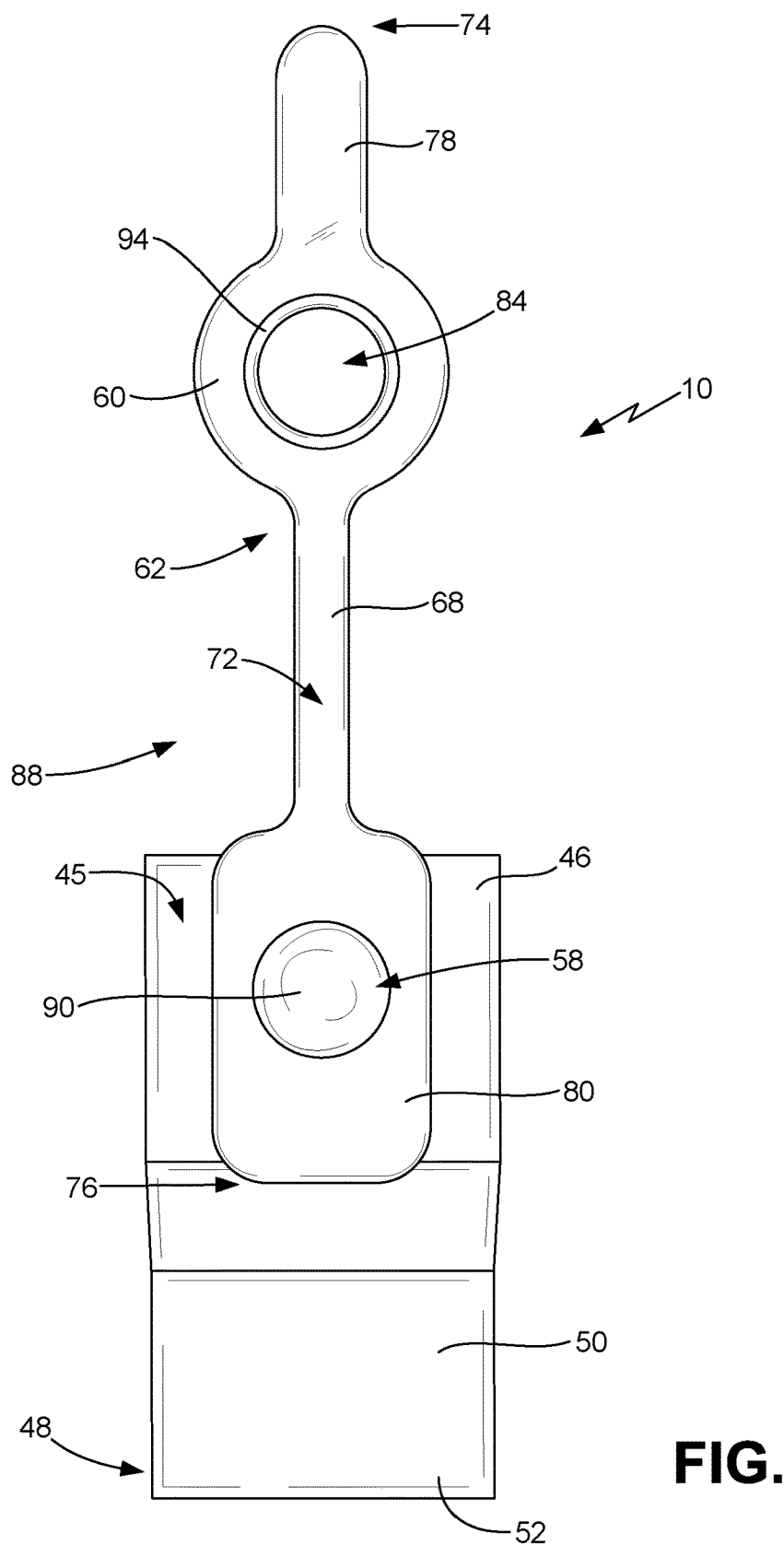
FIG. 10 is a front view of the display clip of FIG. 9.
Figure 11:
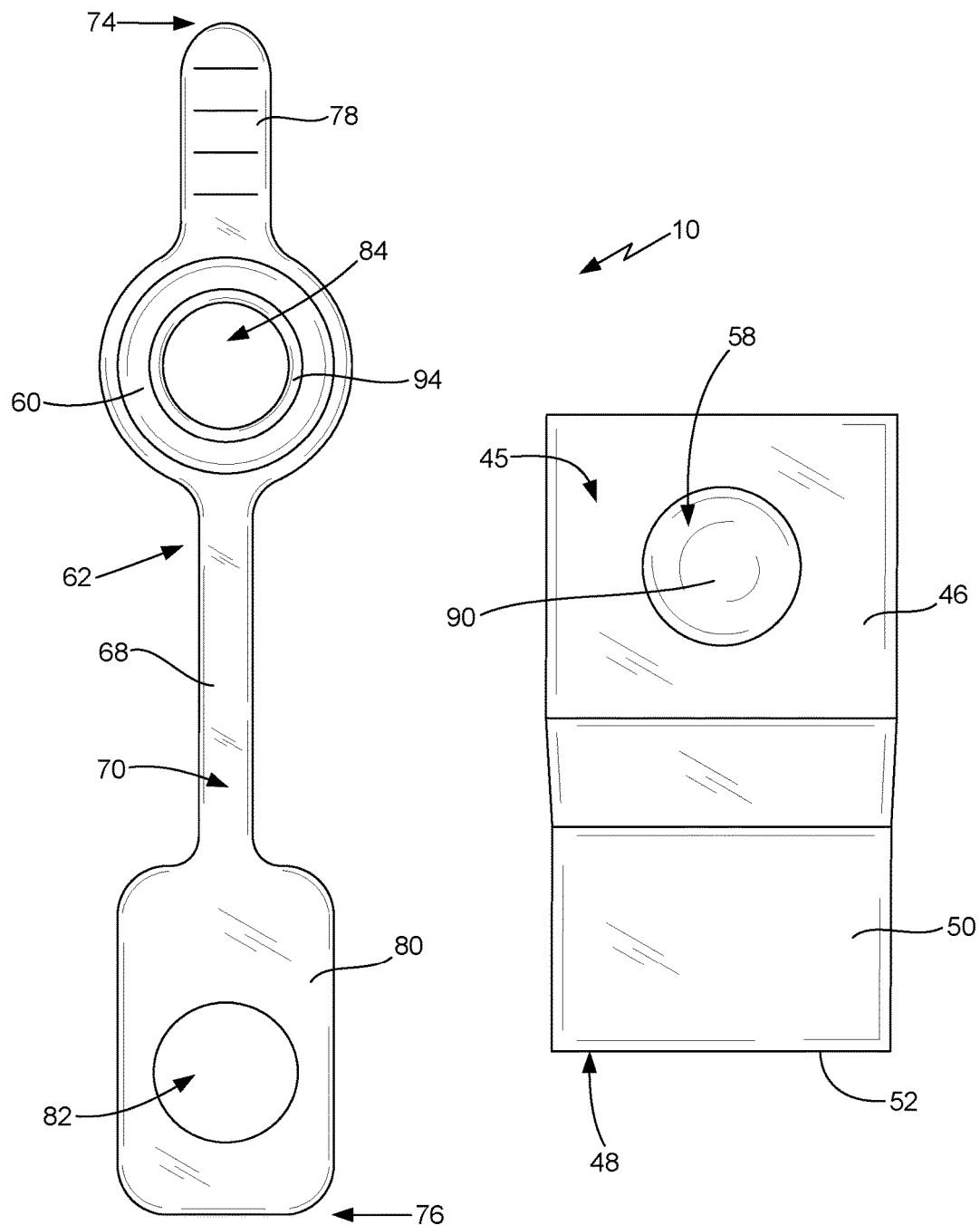
FIG. 11 is an exploded front view of the display clip of FIG. 9.
Figure 12:
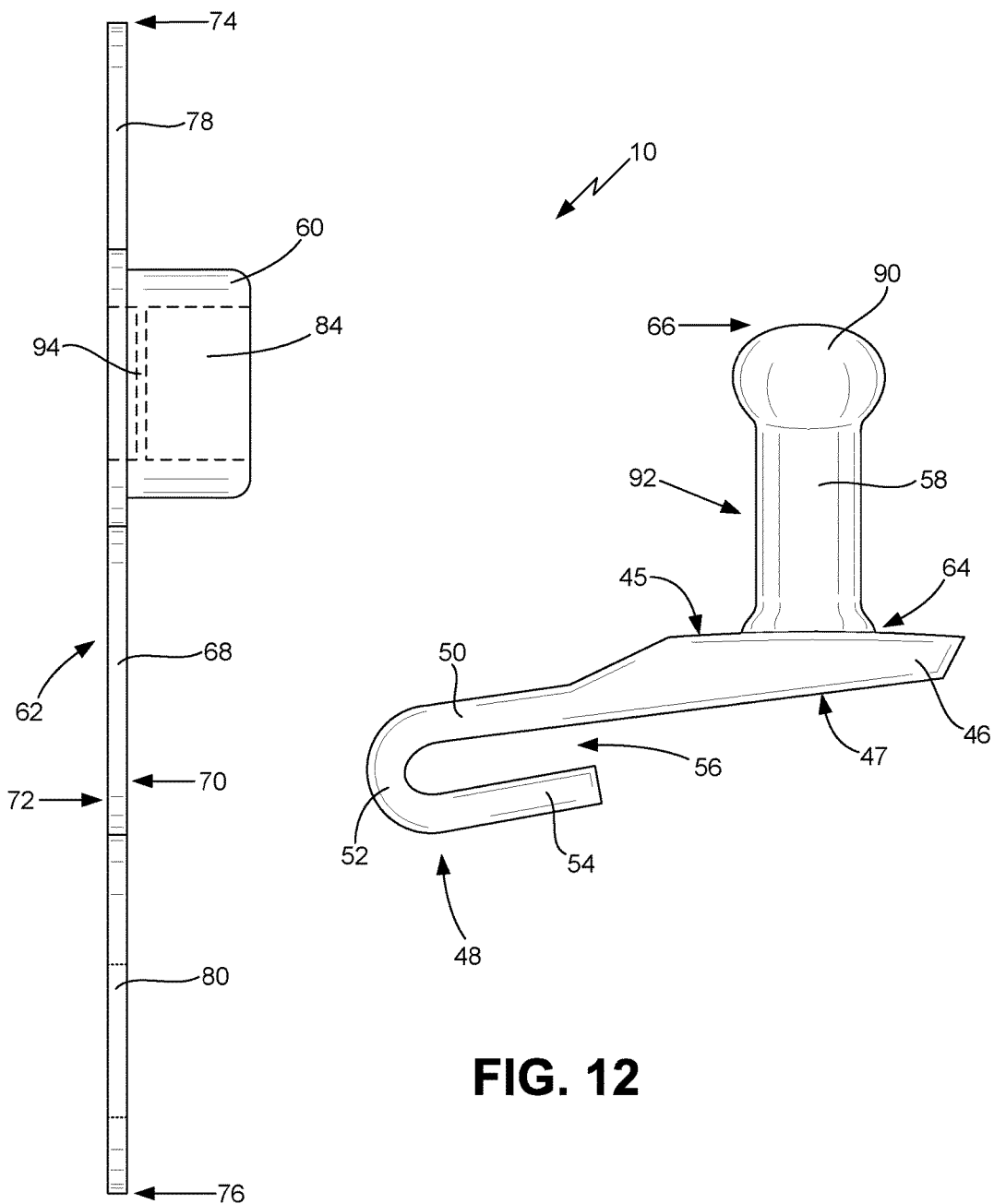
FIG. 12 is a side view of the exploded display clip of FIG. 11.
Figure 13:
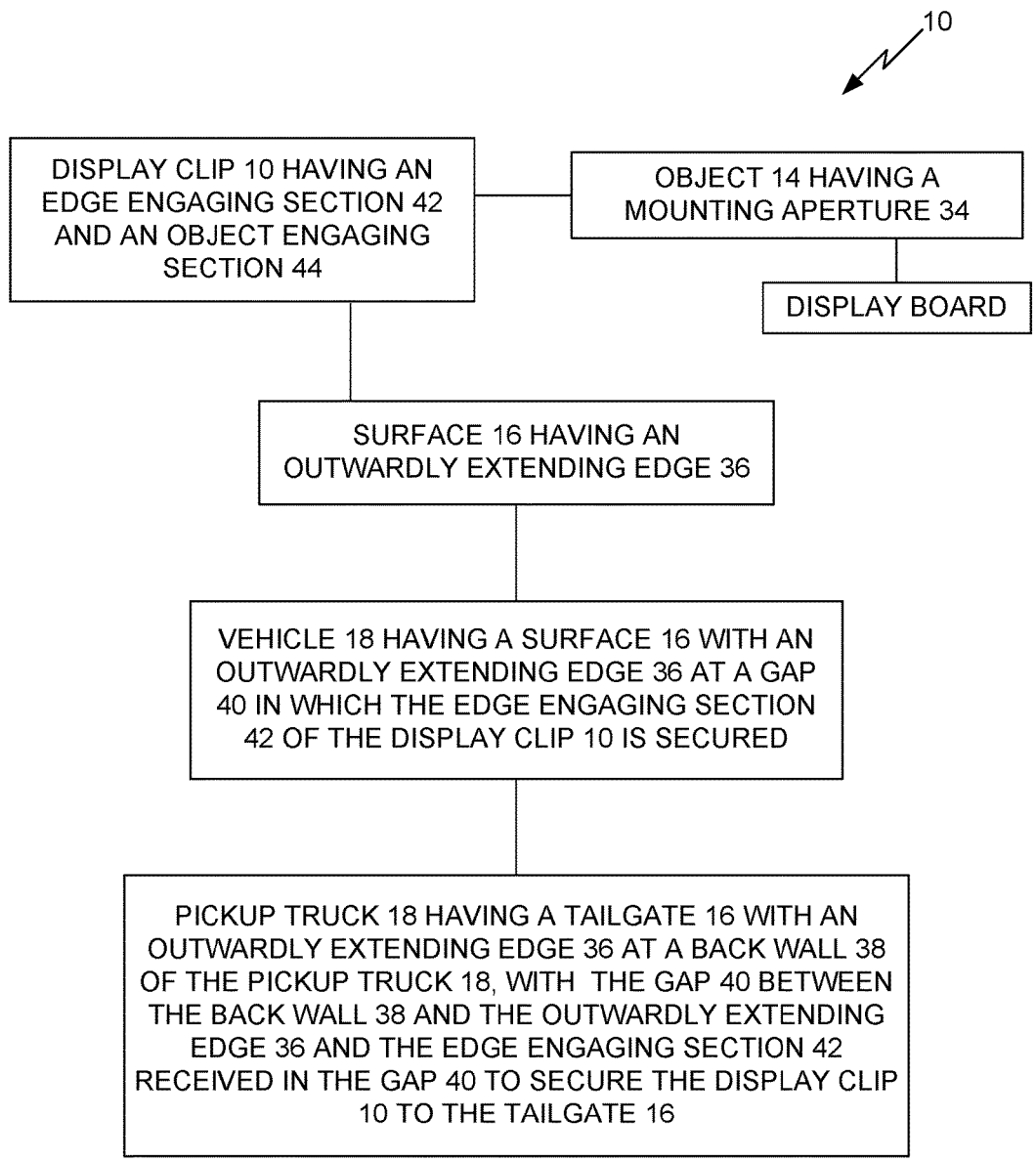
FIG. 13 is a chart summarizing the mounting system of the present invention.

In the embodiment shown in the figures, the object engaging section 44 of the display clip 10 generally comprises an outwardly projecting member 58 that extends outward, in a generally perpendicular manner, from the base 46, an engaging cap 60 that is placed over and engages the projecting member 58 and an elongated mounting strap 62 that connects the engaging cap 60 to the edge engaging section 42, as best shown in FIGS. 5-12. The outwardly projecting member 58 has a proximal end 64 that is attached to or, likely preferred, integral with the base 46 and, as set forth above, a distal end 66 that extends in a generally perpendicular manner outward from the front surface 45 of the base 46 (the back surface 47 of the base 46 will typically be against the surface 16 when the display clip 10 is in use) so as to be removably engaged by the engaging cap 60, as shown in FIGS. 5-8. The mounting strap 62 has a flexible elongated body 68 with a front surface 70, a back surface 72, a first end 74 and a second end 76, as best shown in FIGS. 10-12. The engaging cap 60 is attached to or, likely preferred, integral with the front surface 70 of the mounting strap 62 so the engaging cap 60 will move, as explained in more detail below, with the mounting strap 62, as shown with regard to FIGS. 5 and 9. In the embodiment shown in the figures, the engaging cap 60 is positioned generally toward the first end 74 of the mounting strap 62, as best shown in FIGS. 9-12. The body 68 of mounting strap 62 defines a pull tab 78 at or near its first end 74 that, as set forth below, is utilized by the user to disengage the engaging cap 60 from the projecting member 58, as shown in FIGS. 9 and 10. The body 68 of the mounting strap 62 defines a strap base 80 that is located at, near or generally toward its second end 76, as best shown in FIGS. 10 and 11. In the embodiment shown in the figures, the mounting strap 62 is removably attached to the base 46 of the edge engaging section 42 (the strap 62 is shown separate from the base 46 in FIGS. 11 and 12). To facilitate mounting strap 62 being placed on and removed from the edge engaging section 42, the strap base 80 has a strap base aperture 82 that is sized and configured to be received over the outwardly projecting member 58, as shown in FIGS. 9 and 10. The engaging cap 60 has a cap aperture 84, as shown in FIGS. 11 and 12, that is sized and configured to secure the engaging cap 60 to the projecting member 58, as shown in FIGS. 5-8.

When the engaging cap 60 is placed over and engaged with the outwardly projecting member 58, with outwardly projecting member 58 through the strap base aperture 82 and the cap aperture 84, the display clip 10 is in its locked position 86, as shown in FIGS. 5-8. When the engaging cap 60 is separated from the outwardly projecting member 58, the display clip 10 is in its unlocked position 88, as shown in FIGS. 9 and 10. As will be readily understood by persons who are skilled in the relevant art, engaging or disengaging the engaging cap 60 from the outwardly projecting member 58 moves the display clip 10 between, respectively, its locked position 86 and its unlocked position 88. In a preferred configuration, set forth in more detail below, the engaging cap 60 is structured and arranged to tightly engage the outwardly disposed member 50 to secure the engaging cap 60, and therefore the object engaging section 44, to the edge engaging section 42. To disengage the engaging cap 60 from the outwardly projecting member 58, the user will pull outward on the pull tab 78. The mounting aperture 34 of the display board 14 (the object) is cooperatively sized and configured with the outwardly projecting member 58 so the user can place the mounting aperture 34 over the outwardly projecting member 58 against the strap base 80 when the display clip 10 is in the unlocked position 88. When the display board 14 is in position on the display clip 10 with the outwardly projecting member 58 disposed through mounting aperture 34 of the display board 14, the cap aperture 84 of the engaging cap 60 is placed over the outwardly projecting member 58 to engage the engaging cap 60 with the projecting member 58 and, therefore, secure the display board 14 to the display clip 10, as shown in FIGS. 1-4. When the display clip 10 is being utilized to hold an object 14 in place, each of the base aperture 82, cap aperture 84 and mounting aperture 34 (of the object 14) are generally aligned with the outwardly projecting member 58 extending through each of the apertures 82/84/34.

Preferably, one or more components of the object engaging section 44 are structured and arranged such that once the display clip 10 is placed in its locked position 86, it will not too easily move to its unlocked position 88 so as to reduce the likelihood that the display clip 10 will accidently or inadvertently become disengaged (unlocked) and, if in use, cause the display clip 10 to no longer be able to hold the object 14 on the surface 16. This requires the engaging cap 60 to engage another component such that it is not easily disengaged from that component. In a preferred configuration, the outwardly projecting member 58 and the engaging cap 60 are cooperatively sized and configured so the engaging cap 60 will be tightly received over the projecting member 58 in such a manner that a somewhat forceful tug on the pull strap 78 is required to pull the engaging cap 60 clear of the projecting member 58. In the embodiment shown in the figures, the outwardly projecting member 58 has an enlarged section 90 at or near the distal end 66 thereof, as best shown in FIGS. 5, 7-9 and 12, and a narrower section 92 that extends toward the proximal end 64 of the outwardly projecting section 58, as shown in FIGS. 9 and 12. The enlarged section 90 of the projecting member 58 is cooperatively sized and configured with the cap aperture 84 of the engaging cap 60 such that the user must forcefully push the engaging cap 60 over the enlarged section 90 and onto the narrower section 92 of the outwardly projecting member 58 such that once the engaging cap 60 is past the enlarged section 90 to place the display clip 10 in its locked position 86, as shown in FIGS. 5-8, the engaging cap 60 will not easily be pulled back over the enlarged section 90, which would move the display clip 10 to its unlocked position, as shown in FIGS. 9-10. As set forth above, when properly and cooperatively configured, the user will have to somewhat forcefully pull or tug outwardly on the pull tab 78 to pull the engaging cap 60 off of the outwardly projecting member 58.

As will be readily appreciated by persons skilled in the art, although the cap aperture 84 of the engaging cap 60 and the enlarged section 90 of the outwardly projecting member 58 need to be cooperatively sized and configured, the cap aperture 84 and enlarged section 90 can be of a wide variety of different sizes and configurations. In the embodiment shown in the figures, the enlarged section 90 is generally bulbous shaped and the cap aperture 84 is generally round. In a preferred embodiment, the engaging cap 60 (or at least the portion at cap aperture 84) is made out of a flexible plastic, rubber or like material so the cap aperture 84 can have a slightly smaller diameter than the enlarged section 90 that will stretch open enough so the engaging cap 60 can be pushed tightly over the enlarged section 90 and onto the narrower section 92 of the outwardly projecting member 58. To further facilitate the tight engagement of the cap aperture 84 with the enlarged section 90, the engaging cap 60 can be provided with an inwardly projecting lip 94, shown in FIGS. 6 and 10-12. The inwardly projecting lip 94 is sized and configured to provide the tight engagement of the engaging cap 60 with the enlarged section 90 of the outwardly projecting member 58. Although a variety of other mechanisms can be utilized to safely secure the engaging cap 60 to the outwardly projecting member 58 so as to lock the display clip 10 in its locked position 86, typically with the object 14 being held in place on the surface 16, the use of the tight engagement and the pull tab 78 allows the user to very quickly and easily lock or unlock the display clip 10 to secure the object 14 to the surface 16 or to take the object 14 off of the surface 16.

As shown in FIGS. 1-4 and 13, the system 12 of the present invention generally comprises surface 16 having an outwardly extending edge 36 associated therewith, object 14 having at least one mounting aperture 34 and the display clip 10 described above to removably and securely position (i.e., hold or attach) the object 14 onto the surface 16. As set forth above, the outwardly extending edge 36 can be integral with, attached to or otherwise associated with the surface 16 and the object 14 can have the mounting aperture 34 as part of the object 14 (such as the holes in the display board shown in FIG. 4) or a device can be attached to the object 14 to provide the mounting aperture 34. In one embodiment, the display clip 10 can be utilized with a vehicle 18, such as a car, truck, boat or the like, that has a surface 16 on which the object 14 will be placed, with the surface 16 having an outwardly extending edge 36 near a gap 40, such as at a door, in which the edge engaging section 42 of the display clip 10 is secured (i.e., by closing the door). In another embodiment, the display clip 10 can be utilized with a pickup truck 18 having a tailgate 16 (as the surface) with an outwardly extending edge 36 that is positioned at a back wall 38 of the pickup truck 18, with gap 40 being between the back wall 38 and the outwardly extending edge 36, such that the edge engaging section 42 of the display clip 10 placed at the outwardly extending edge 36, when the tailgate 16 is in its open condition 26 (as shown in FIGS. 2 and 3), and is received in the gap 40 to secure the display clip 10 to the tailgate 16 when the tailgate 16 is placed in its closed condition 24, as shown in FIGS. 1 and 4.

The new display clip 10 can be made out of a wide variety of different materials. For a relatively low cost unit, the edge engaging section 42, with the outwardly projecting member 58, can be molded as a single integral unit, as with the embodiment shown in the figures, out of plastic, rubber or like material that will provide a sufficiently stiff/rigid edge engaging section 42 and outwardly projecting member 58. Separately, in the embodiment shown, the engaging cap 60 and strap 62 of the object engaging section 44 can be molded as a single unit out of plastic, rubber or like material that will provide a sufficiently stiff/rigid engaging cap 60 and a sufficiently flexible mounting strap 62. In use, the edge engaging section 42, with the outwardly projecting member 58, with or without the engaging cap 60 and mounting strap 62 attached thereto, is positioned with the edge engaging gap 56 formed by the hook 48 over the outwardly extending edge 36, as shown in FIGS. 2 and 3. When the display clip 10 is used with a tailgate or door as the surface 16, the tailgate/door (surface) 16 is placed in its closed condition 24 to position the inwardly disposed member 54 behind the surface 16 and the curved member 52 in the gap 40 to secure the display clip 10 to the surface 16. If the mounting strap 62 is not attached, the user attaches the mounting strap 62 to the edge engaging section 42 by placing the base aperture 82 of the strap base 80 over the outwardly projecting member 58, such that the outwardly projecting member 58 extends through the base aperture 82. The mounting aperture 34 of the object 14 is placed over the outwardly projecting member 58, such that the outwardly projecting member 58 extends through the base aperture 82 and the mounting aperture 34. The cap aperture 84 of the engaging cap 60 is then aligned with the outwardly projecting member 58. The user then presses the engaging cap 60 against the outwardly projecting member 58 to force the enlarged section 90 past the inwardly projecting lip 94 and through the cap aperture 84 to the narrower section 92 to place the display clip 10 in its locked condition 86 and securely, but removably, mount the object 14 to the surface 16. To replace the object 14, the user merely pulls on the pull tab, somewhat forcibly, to pull the engaging cap 60 off of the outwardly projecting member 58 and place the display clip 10 in its unlocked position 88. The object 14 can be pulled away, separating the mounting aperture 34 from the outwardly projecting member 58. When the mounting clip 10 is no longer needed, the user merely has to separate the edge engaging section 42 from the outwardly extending edge 36. In the tailgate example, the user merely has to unlatch the tailgate 16 (as the surface) and move it to its open condition 26 and remove the display clip 10 from the edge 34.

As set forth above, the use of display clip 10 with a display board or the like as the object 14 and a door or tailgate as the surface 16 are provided as exemplary uses of the new display clip 10. In another example, the display clip 10 of the present invention can be utilized to hold an object 14 on a wall, as the surface 16. As will be readily apparent to persons skilled in the art, all that is required is that the object 14 have at least one mounting aperture 34 that is or can be associated with the object 14 and is positioned relative to the object 14 such that the outwardly projecting member 58 can pass through the mounting aperture 34 and the engaging cap 60 can engage another component (i.e., the enlarged section 90 of the outwardly projecting member 58) of the display clip 10 to place the display clip 10 in its locked position 86. In one potential use of the new display clip 10, the user can attach a bracket or other device on a wall, as the surface 16, such that the bracket/device will provide the outwardly extending edge 36 over which the hook 48 of the edge engaging section 42 can be placed (with the edge 36 being received into the edge engaging gap 56) such that the base 46 hangs down from the bracket/device and the outwardly projecting member 58 projects outward or away from the wall 16. The mounting aperture 34 of the object 14, which may be a display board or a wide variety of objects, is placed over the outwardly projecting member 58 and then the engaging cap 60 is pushed down over the enlarged section 90 and onto the narrower section 92 of the projecting member 58 to place the display clip 10 in its locked position 86 to securely, but removably, mount the object 14 on the wall 16. As will be readily appreciated by persons who are skilled in the art, a wide variety of uses (including different types of objects 14 and surfaces 16) are also possible with the new display clip 10.

Figure 14:
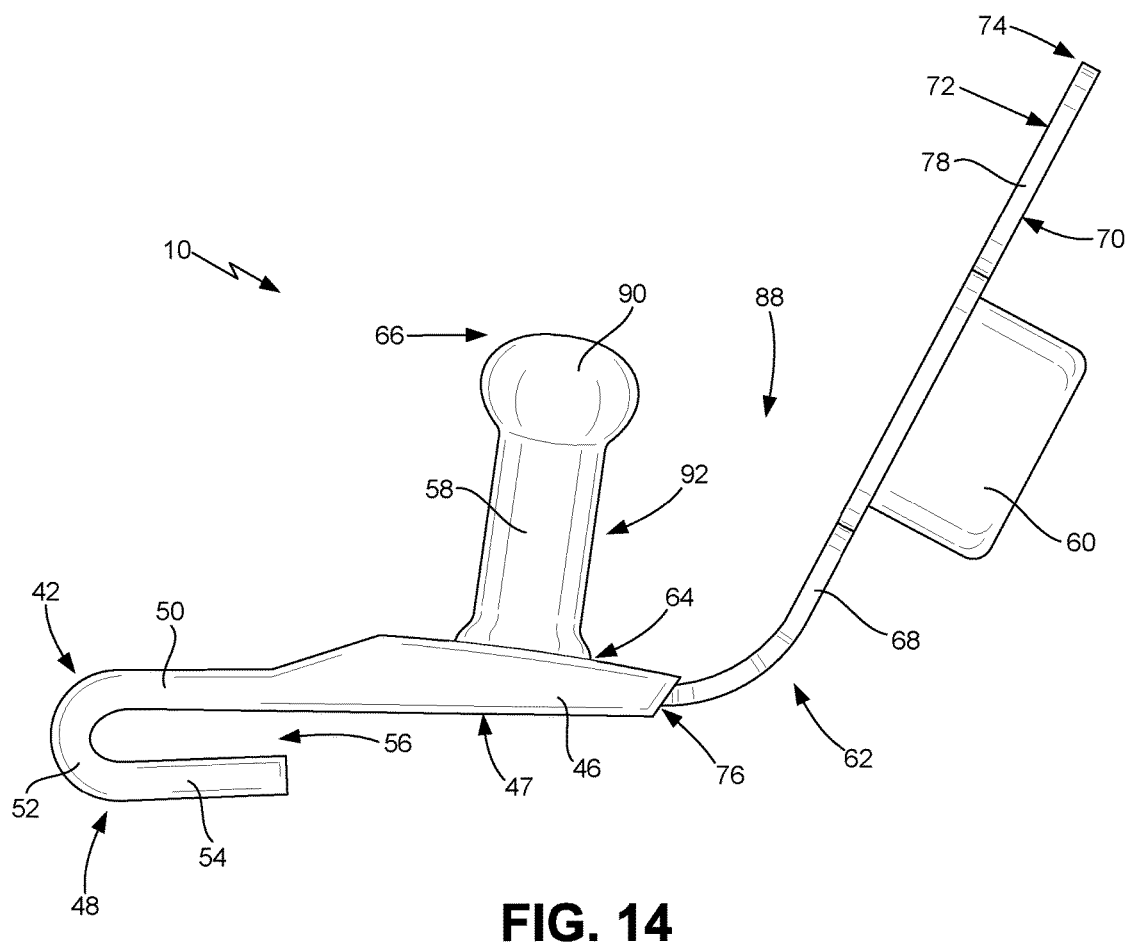
FIG. 14 is a side view of a display clip that is configured according to a second embodiment of the present invention showing the mounting strap attached to or integral with the base of the edge engaging section.

In an alternative embodiment of the display clip 10 of the present invention, the engaging strap 60 can be fixedly attached to or integral with the base 46 of the edge engaging section 42, as shown in FIG. 14. In one configuration, the strap base 80, with the base aperture 82, can be fixedly attached or integrally formed with the base 46. In the embodiment of FIG. 14, the display clip 10 does not require the strap base 80 or base aperture 82, as the elongated strap body 68 extends directly from the base 46 to the engaging cap 60, thereby having the engaging cap 60 attached directly to the base 46. In another alternative embodiment, the display strap 10 can not use the mounting strap 62 at all. In this embodiment, the engaging cap 60 would be loose and not connected or attached to the base 46 of the edge engaging section 42.

Figure 15:
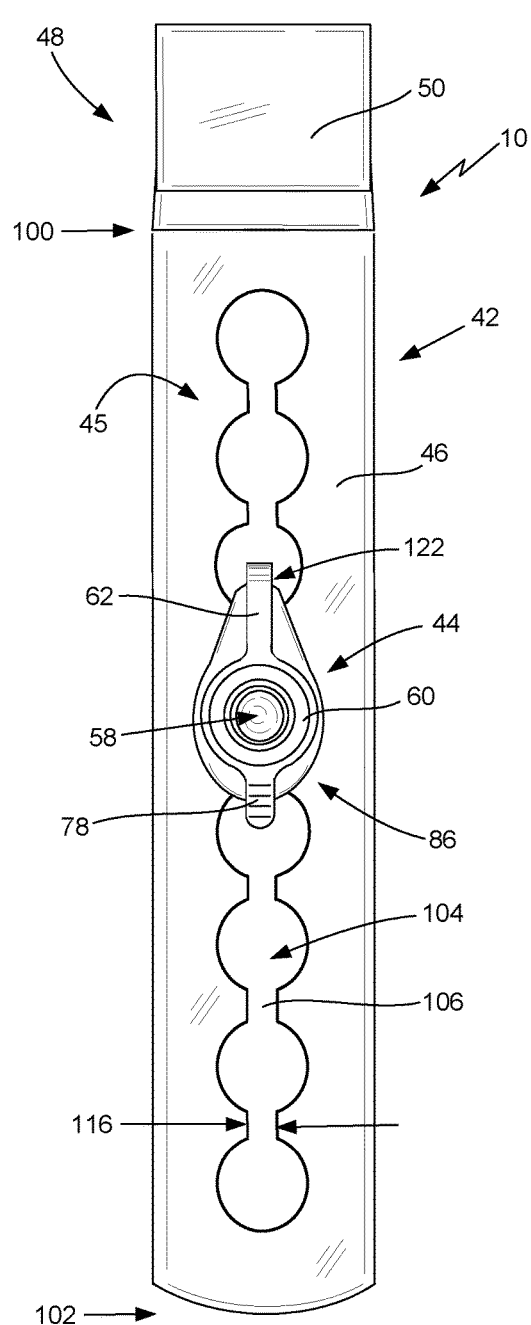
FIG. 15 is a front view of a display clip that is configured according to a third embodiment of the present invention showing an adjustable position edge engaging section having a base with a plurality of interconnected positioning apertures and the object engaging section of the display clip mounted to the base, with the display clip shown in its locked position.
Figure 16:
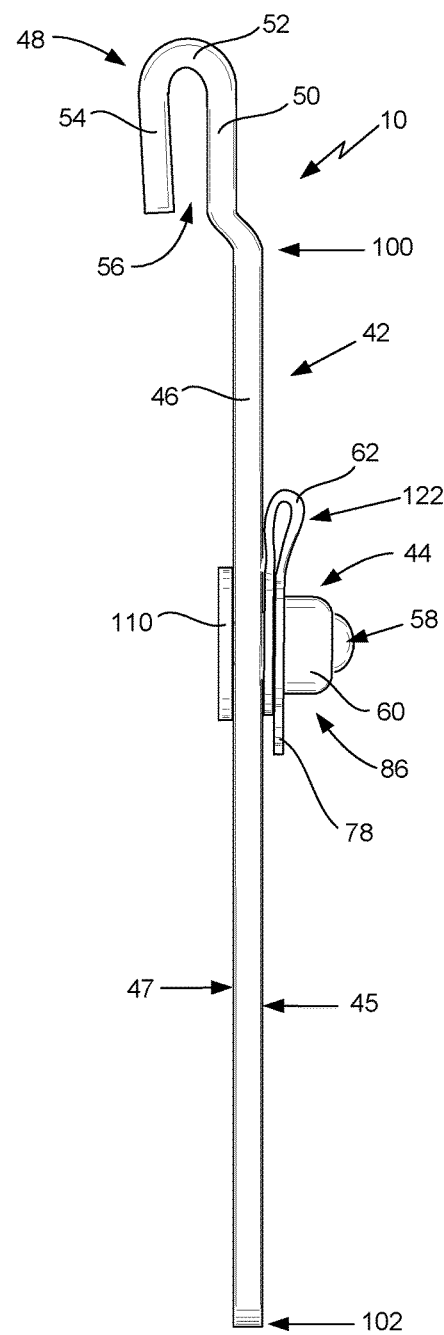
FIG. 16 is a side view of the display clip of FIG. 15.
Figure 17:
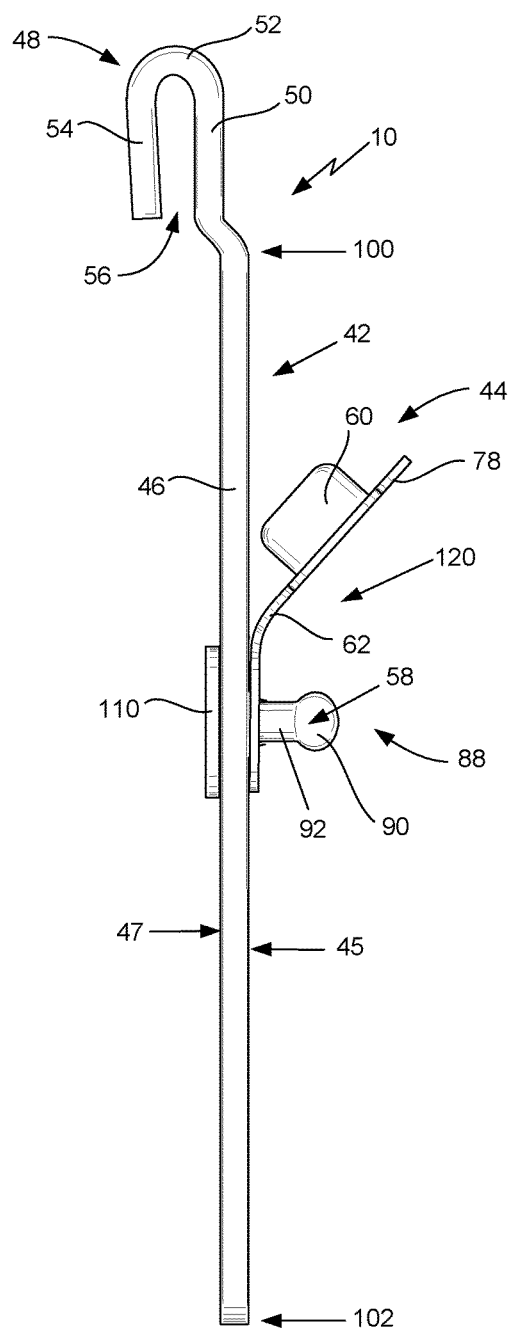
FIG. 17 is a side view of the display clip of FIG. 16 with the display clip shown in its unlocked position.
Figure 18:
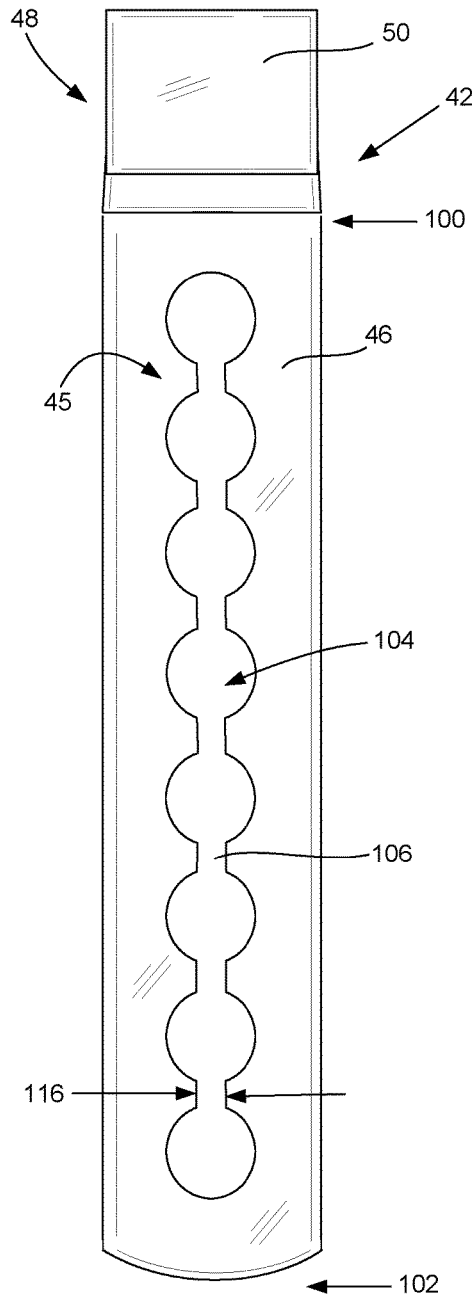
FIG. 18 is a front view of the edge engaging section of the display clip of FIG. 15.

Another alternative embodiment of the display clip 10 of the present invention is shown in FIGS. 15-21. This new display clip 10 can be utilized with the mounting system 12 described above. In this embodiment, the edge engaging section 42 and object engaging section 44 of the display clip 10 are configured to allow the user to adjust the positioning of the object 14 relative to the outwardly extending edge 36 of the surface 16 against which the object 14 will be positioned and to be able to accommodate different sizes of objects 14. As shown in FIGS. 15-18, the edge engaging section 42 of this embodiment has an elongated base 46 with a first or upper end 100 and a second or lower end 102. The edge engaging section 42 has a hook 48 that is attached to or integral with the first/upper end 100 of the elongated base 46. The base 46 has a front surface 45 and a back surface 47, with the hook 48 extending outwardly from the base 46 to define an edge engaging gap 60 that, as described above, is sized and configured so the hook 48 can be positioned over the outwardly extending edge 36 of the surface 16 with the back surface 47 of the base 46 at or against the surface 16. The elongated base 46 has a plurality of positioning apertures 104, as best shown in FIGS. 15 and 18, that are each sized and configured for the outwardly projecting member 58 of a modified object engaging section 44 to pass therethrough, as shown in FIGS. 15-17. In a preferred configuration of this embodiment, each positioning aperture 104 is joined to an adjacent positioning aperture 104 by a connecting slot 106 that, as described in more detail below, allows the user to easily move the object engaging section 44 up and down the base 46 of the edge engaging section 42 between positioning apertures 104 so he or she may select a positioning aperture 104 that will align with the mounting aperture 34 of the object 14, which will depend on the size of the object 14, in order to position the object 14 where desired.

Figure 19:
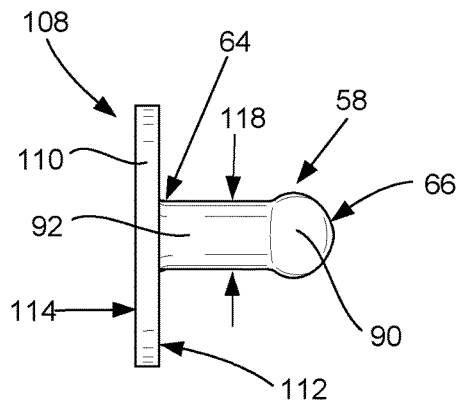
FIG. 19 is a side view of the outwardly projecting member of the display clip of FIG. 15, showing the outwardly projecting member as a separate item with a base portion.
Figure 20:
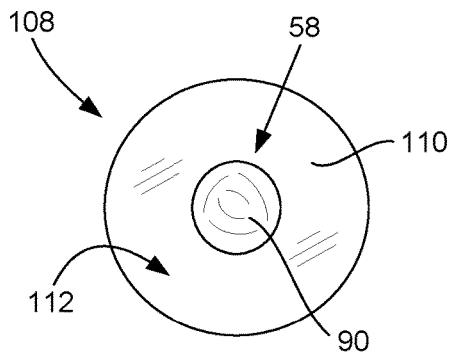
FIG. 20 is a front view of the outwardly projecting member of FIG. 19.

The object engaging section 44 of the embodiment of the display clip 10 of FIGS. 15-22 has an engaging member 108 that is utilized with the engaging cap 60 and mounting strap 62 described above. In this embodiment, the engaging member 108 supports the outwardly projecting member 58 that is received through the mounting aperture 34 of the object 14 to support the object 14 on the surface 16. As shown in FIGS. 16-17 and 19, the separate engaging member 108 has an enlarged back panel 110. The proximal end 64 of the outwardly projecting member 58 is attached to or integral with the enlarged back panel 110, instead of the base 48 of the edge engaging section 42 in the embodiments described above, as best shown in FIG. 19. The outwardly projecting member 58 extends outwardly from a forwardly disposed front surface 112 of the back panel 110, typically generally perpendicular thereto, to dispose the distal end 66 of the outwardly projecting member 58 in spaced apart relation to the front surface 112 of the back panel 110. Back panel 110 also has an opposite facing, rearwardly disposed, back surface 114. As described above, the outwardly projecting member 58 has an enlarged section 90 at the distal end 66 and a narrower section 92 that extends to the proximal end 64 that is attached to or integral with the base panel 110.

The enlarged section 90 of the outwardly projecting member 58 and the positioning apertures 104 of the base 46 are cooperatively sized and configured for the enlarged section 90 to fit through the positioning apertures 104 so as to extend outward therefrom, as shown in FIGS. 16-17, to receive a mounting aperture 34 of the object 14 and to be engaged by the engaging cap 60 to, as set forth above with regard to the above-described embodiments, the secure the object 14 on the display clip 10. In a preferred configuration of the present embodiment, the connecting slots 106 are cooperatively sized and configured with the outwardly projecting member 58 such that the enlarged section 90 thereof will not pass through the connecting slots 106 but the narrower section 92 will so the engaging member 108 can be slid up and down the base 46 from one positioning aperture 104 to another. This will allow the user to select the positioning aperture 104 that is best suited for the object 14 and surface 16, which will depend on the size of the object 14 relative to the surface 16 on which the object 14 is to be displayed, so as to align the mounting aperture 34 of the object 14 with the outwardly projecting member 58 of the display clip 10 for different distances between the outwardly extending edge 36 of surface 16 and the mounting aperture 34 of the object 14. In the preferred configuration, the narrower section 92 of the outwardly projecting member 58 and the connecting slot 106 of the base 46 are cooperatively sized and configured such that the narrower section 92 is tightly engaged by the connecting slot 106 so the user has to forcibly push the outwardly projecting member 58 through the connecting slot 106. The desired tight engagement can be achieve by making the width 116 of the connecting slot 106 slightly to somewhat less than the width 118 (i.e., diameter) of the narrower section 92, with the respective widths 116 and 118 shown in FIGS. 16 and 18, such that the outwardly projecting member 58 cannot move from a positioning aperture 104 without some effort by the user. As will be readily appreciated by persons who are skilled in the relevant art, the tight engagement of the narrower section 92 in the connecting slot 106 will prevent any unintentional movement of the engaging member 108 relative to the base 46 (such as due to gravity, wind or other pulling forces), which would otherwise result in undesirable movement of the object 14 relative to the outwardly extending edge 36 of the surface 16. A tight engagement will still allow the user to move, with some effort, the engaging member 108 from one positioning aperture 104 to another. In another configuration of the present embodiment, the base 46 does not have any connecting slots 106, just the plurality of positioning apertures 104. In this configuration, the user positions the engaging member 108 where desired by moving the outwardly projecting member 58 from one positioning aperture 104 to another by repeatedly inserting and removing the outwardly projecting member 58 from positioning apertures 104 as necessary to obtain the desired placement of the object 14 on the surface 16.

Figure 21:
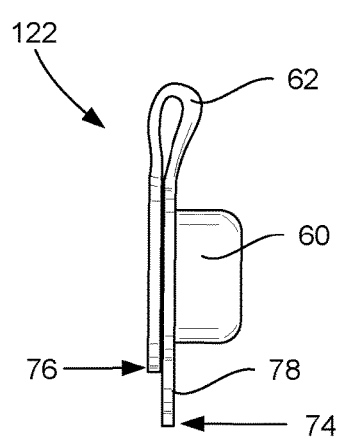
FIG. 21 is a side view of the engaging cap and mounting strap of the display clip of FIG. 15 shown in the folded position.
Figure 22:
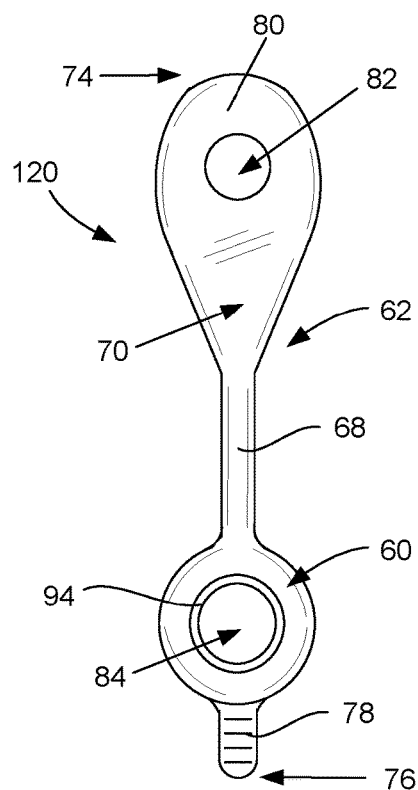
FIG. 22 is a front view of the engaging cap and mounting strap of FIG. 21 shown in its extended position.

As with the above embodiments, in a preferred configuration of the present invention the engaging cap 60 is attached to or integral with a mounting strap 62 that has a strap base 80 with a base aperture 82 therethrough. These components are sized and configured to move between an extended position 120, as shown in FIG. 22, and a folded position 122, as shown in FIG. 21, to allow the user to easily move the display clip 10 between its locked position 86, shown in FIGS. 15 and 16, and its unlocked position 88, shown in FIG. 17. As set forth above with the previously described embodiments, in the locked position 86 the engaging cap 60 is placed over and engaged with the outwardly projecting member 58, with outwardly projecting member 58 through the strap base aperture 82 and the cap aperture 84, the display clip 10 is in its locked position 86. In the unlocked position, the engaging cap 60 is separated from the outwardly projecting member 58, the display clip 10. As will be readily understood by persons who are skilled in the relevant art, engaging or disengaging the engaging cap 60 from the outwardly projecting member 58 (i.e., moving between the folded position 122 and the extended position 120) moves the display clip 10 between, respectively, its locked position 86 and its unlocked position 88. As also set forth above, in the preferred configurations, the engaging cap 60 is structured and arranged to tightly engage the outwardly disposed member 50 to secure the engaging cap 60, and therefore the object engaging section 44, to the edge engaging section 42. To disengage the engaging cap 60 from the outwardly projecting member 58, the user will pull outward on the pull tab 78. The mounting aperture 34 of the display board 14 (the object) is cooperatively sized and configured with the outwardly projecting member 58 so the user can place the mounting aperture 34 over the outwardly projecting member 58 against the strap base 80 when the display clip 10 is in the unlocked position 88. When the object 14 is positioned on the display clip 10 to mount the object 14 to the surface 16, the outwardly projecting member 58 of the engaging member 108 is disposed through mounting aperture 34 of the display board 14. To secure the object 14 to the display clip 10, the cap aperture 84 of the engaging cap 60 is placed over the outwardly projecting member 58 to engage the engaging cap 60 with the projecting member 58, as shown in FIGS. 15-16. When the display clip 10 is being utilized to hold an object 14 in place, each of the base aperture 82, cap aperture 84, positioning aperture 104 and mounting aperture 34 (of the object 14) are generally aligned with the outwardly projecting member 58.

Preferably, one or more components of the object engaging section 44 are structured and arranged such that once the display clip 10 is placed in its locked position 86, it will not too easily move to its unlocked position 88 so as to reduce the likelihood that the display clip 10 will accidently or inadvertently become disengaged (unlocked) and, if in use, cause the display clip 10 to no longer be able to hold the object 14 on the surface 16. Typically, this requires the engaging cap 60 to engage another component such that it is not easily disengaged from that component. In a preferred configuration, the outwardly projecting member 58 and the engaging cap 60 are cooperatively sized and configured so the engaging cap 60 will be tightly received over the projecting member 58 in such a manner that a somewhat forceful tug on the pull strap 78 is required to pull the engaging cap 60 clear of the projecting member 58. In the embodiment shown in the figures, the enlarged section 90 of the outwardly projecting member 58 is cooperatively sized and configured with the cap aperture 84 of the engaging cap 60 such that the user must forcefully push the engaging cap 60 over the enlarged section 90 and onto the narrower section 92 of the outwardly projecting member 58 such that once the engaging cap 60 is past the enlarged section 90 to place the display clip 10 in its locked position 86, as shown in FIGS. 15-16, the engaging cap 60 will not easily be pulled back over the enlarged section 90, which would move the display clip 10 to its unlocked position, as shown in FIG. 17. As set forth above, when properly and cooperatively configured, the user will have to somewhat forcefully pull or tug outwardly on the pull tab 78 to pull the engaging cap 60 off of the outwardly projecting member 58.

As will be readily appreciated by persons who are skilled in the art, although the cap aperture 84 of the engaging cap 60 and the enlarged section 90 of the outwardly projecting member 58 need to be cooperatively sized and configured, the cap aperture 84 and enlarged section 90 can be of a wide variety of different sizes and configurations. In the embodiment shown in the figures, the enlarged section 90 is generally bulbous shaped and the cap aperture 84 is generally round. In a preferred embodiment, the engaging cap 60 (or at least the portion at cap aperture 84) is made out of a flexible plastic, rubber or like material so the cap aperture 84 can have a slightly smaller diameter than the enlarged section 90 that will stretch open enough so the engaging cap 60 can be pushed tightly over the enlarged section 90 and onto the narrower section 92 of the outwardly projecting member 58. To further facilitate the tight engagement of the cap aperture 84 with the enlarged section 90, the engaging cap 60 can be provided with an inwardly projecting lip 94, shown with regard to the embodiment of FIGS. 6 and 10-12. The inwardly projecting lip 94 is sized and configured to provide the tight engagement of the engaging cap 60 with the enlarged section 90 of the outwardly projecting member 58. A variety of other mechanisms can be utilized to safely secure the engaging cap 60 to the outwardly projecting member 58 so as to lock the display clip 10 in its locked position 86. The use of the tight engagement and the pull tab 78 allows the user to very quickly and easily lock or unlock the display clip 10 to secure the object 14 to the surface 16 or to take the object 14 off of the surface 16.

As described in more detail above, the new system 12 of the present invention generally comprises a surface 16 having an outwardly extending edge 36 associated therewith, an object 14 having at least one mounting aperture 34 and the display clip 10 to removably and securely hold or attach the object 14 onto the surface 16. As set forth above, the outwardly extending edge 36 can be integral with, attached to or otherwise associated with the surface 16 and the object 14 can have the mounting aperture 34 as part of the object 14 (such as the holes in the display board shown in FIG. 4) or a device can be attached to the object 14 to provide the mounting aperture 34. In one use, the display clip 10 can be utilized with a vehicle 18, such as a car, truck, boat or the like, that has a surface 16 on which the object 14 will be placed, with the surface 16 having an outwardly extending edge 36 near a gap 40, such as at a door, in which the edge engaging section 42 of the display clip 10 is secured (i.e., by closing the door). In another embodiment, the display clip 10 can be utilized with a pickup truck 18 having a tailgate 16 (as the surface) with an outwardly extending edge 36 that is positioned at a back wall 38 of the pickup truck 18, with gap 40 being between the back wall 38 and the outwardly extending edge 36, such that the edge engaging section 42 of the display clip 10 placed at the outwardly extending edge 36, when the tailgate 16 is in its open condition 26 (as shown in FIGS. 2 and 3), and is received in the gap 40 to secure the display clip 10 to the tailgate 16 when the tailgate 16 is placed in its closed condition 24, as shown in FIGS. 1 and 4.

As with the above embodiments, the display clip 10 of the present embodiment can be made out of a wide variety of different materials. For a relatively low cost unit, the edge engaging section 42 can be molded as a single integral unit out of plastic, rubber or like material that will provide a sufficiently stiff/rigid edge engaging section 42. Likewise, the engaging member 108, with the outwardly projecting member 58 and back panel 110, can be molded as a single integral unit out of plastic, rubber or like material that will be sufficiently stiff/rigid (both the outwardly projecting member 58 and back panel 110). Separately, in the embodiment shown, the engaging cap 60 and strap 62 of the object engaging section 44 can be molded as a single unit out of plastic, rubber or like material that will provide a sufficiently stiff/rigid engaging cap 60, which is sufficiently flexible to engage the enlarged section 90 of the outwardly projecting member 58, and a flexible mounting strap 62.

In use, the engaging member 108 is engaged with the base 46 of the edge engaging section 42 by placing the outwardly projecting member 58 of the engaging member 108 through one of the positioning apertures 104 of the base 46 with the front surface 112 of the back panel 110 against the back surface 47 of the base 46 and the outwardly projecting member 58 extending outward from the front surface 45 of the base 46, as shown in FIGS. 16-17. The hook 48 of the edge engaging section 42 is attached to the surface 16 by placing the hook 48 over the outwardly extending edge 36 thereof. When the display clip 10 is used with a tailgate or door as the surface 16, the tailgate/door (surface) 16 is placed in its closed condition 24 to position the inwardly disposed member 54 behind the surface 16 and the curved member 52 in the gap 40 to secure the display clip 10 to the surface 16. The user attaches the mounting strap 62, having the engaging cap 60 attached thereto or integral therewith, to the engaging member 108 by placing the base aperture 82 of the strap base 80 over the outwardly projecting member 58, such that the outwardly projecting member 58 extends through the base aperture 82. The mounting aperture 34 of object 14 is placed over the outwardly projecting member 58, such that the outwardly projecting member 58 extends through the positioning aperture 104, base aperture 82 and mounting aperture 34, with the display clip 10 in its unlocked position 88, as shown in FIG. 17. The user moves the mounting strap 62 to its folded position 122 to align the cap aperture 84 of the engaging cap 60 with the outwardly projecting member 58. The user then presses engaging cap 60 against the enlarged section 90 of the outwardly projecting member 58 to force the enlarged section 90 past the inwardly projecting lip 94 and through the cap aperture 84 to the narrower section 92 to place the display clip 10 in its locked condition 86 and securely, but removably, mount the object 14 to the surface 16. The user then moves the engaging member 108 up or down along the elongated base 46 from one positioning aperture 104 to another, as may be necessary, to position the outwardly projecting member 58 where the display clip 10 will be of most benefit to the object 14. As set forth above, the tight fit between the narrower section 92 of the outwardly projecting member 58 and the connecting slot 106 will prevent the engaging member 108 from moving out of the chosen positioning aperture 104. To replace the object 14, the user merely pulls on the pull tab, somewhat forcibly, to pull the engaging cap 60 off of the outwardly projecting member 58 and place the display clip 10 in its unlocked position 88. The object 14 is then pulled away from the outwardly projecting member 58. When the mounting clip 10 is no longer needed, the user merely has to separate the edge engaging section 42 from the outwardly extending edge 36 to which the display clip 10 is attached. In the tailgate example, the user merely has to unlatch the tailgate 16 (as the surface 14) and move it to its open condition 26 and remove the display clip 10 from the outwardly extending edge 36.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A display clip for mounting an object having a mounting aperture to a surface having an outwardly extending edge, said display clip comprising:

an edge engaging section having an elongated base and a hook, said base having a front surface, a back surface and one or more positioning apertures disposed therethrough between a first end and a second end of said base, said hook attached to or integral with said first end of said base and configured to extend outwardly from said back surface of said base to define an edge engaging gap that is sized and configured to receive the outwardly extending edge of the surface therein; and an object engaging section having an engaging member and an engaging cap, said engaging member having an outwardly projecting member and a back panel, said outwardly projecting member having a proximal end attached to or integral with said back panel and a distal end extending outward from said back panel so as to dispose said distal end in spaced apart relation to a front surface of said back panel, said outwardly projecting member being sized and configured to pass through said one or more positioning apertures and the mounting aperture of the object, said engaging cap structured and arranged to removably engage said outwardly engaging member so as to place said display clip in a locked position, said object engaging section configured to support the object on the surface when said hook is placed on the outwardly extending edge of the surface, said display clip is in said locked position with said outwardly extending member through the mounting aperture of the object and the object positioned between said front surface of said base and said engaging cap.

2. The display clip of claim 1, wherein said object engaging section further comprises a mounting strap having a flexible elongated body with a first end defining a strap base with a base aperture therethrough and a second end that is attached to or integral with said engaging cap, said strap base being sized and configured to be placed over said outwardly projecting member with said outwardly extending member extending through said base aperture so as to attach said mounting strap to said engaging member.

3. The display clip of claim 1, wherein said engaging cap has a cap aperture sized and configure to receive and engage said outwardly projecting member and secure said display clip in said locked position.

4. The display clip of claim 3, wherein said outwardly projecting member has an enlarged section at or near said distal end thereof, said enlarged section cooperatively sized and configured with said cap aperture of said engaging cap to secure said engaging cap to said outwardly projecting member when said display clip is in said locked position.

5. The display clip of claim 4, wherein said outwardly projecting member has a narrower section at or near said proximal end thereof, said narrower section sized and configured to receive said cap aperture of said engaging cap after said enlarged section of said outwardly projecting member has passed through said cap aperture, said enlarged section cooperatively sized and configured with said cap aperture to prevent said display clip from inadvertently moving to an unlocked position having said engaging cap disengaged from said outwardly projecting member.

6. The display clip of claim 5, wherein said engaging cap further comprises an inwardly projecting lip associated with said cap aperture, said inwardly projecting lip sized and configured to tightly engage said enlarged section when positioning said display clip in said locked condition and to prevent said display clip from inadvertently moving to an unlocked position with said engaging cap disengaged from said outwardly projecting member.

7. The display clip of claim 1, wherein said base had as a plurality of positioning apertures disposed between said first end and said second end of said base, each of said plurality of positioning apertures sized and configured to receive said outwardly extending member therethrough.

8. The display clip of claim 7 further comprising a connecting slot disposed between and interconnecting adjacent said positioning apertures, said connecting slot sized and configured to allow said outwardly engaging member to move between one or more of said positioning apertures.

9. The display clip of claim 8, wherein said outwardly projecting member has a narrower section at or near said proximal end thereof and an enlarged section at or near said distal end thereof, said outwardly projecting member and said connecting slot being cooperatively sized and configured for said connecting slot to tightly engage said narrower section and to prevent passage of said enlarged section through said connecting slot.

10. A display clip for mounting an object having a mounting aperture to a surface having an outwardly extending edge, said display clip comprising:
an edge engaging section having an elongated base and a hook, said base having a front surface, a back surface and a plurality of positioning apertures disposed therethrough between a first end and a second end of said base, said hook attached to or integral with said first end of said base and configured to extend outwardly from said back surface of said base to define an edge engaging gap that is sized and configured to receive the outwardly extending edge of the surface therein; and
an object engaging section having an engaging member, an engaging cap and a mounting strap, said engaging member having an outwardly projecting member and a back panel, said outwardly projecting member having a proximal end attached to or integral with said back panel and a distal end extending outward from said back panel so as to dispose said distal end in spaced apart relation to a front surface of said back panel, said outwardly projecting member being sized and configured to pass through said one or more positioning apertures and the mounting aperture of the object, said engaging cap structured and arranged to removably engage said outwardly engaging member so as to place said display clip in a locked position, said mounting strap having a flexible strap body attached to or integral with said engaging cap to secure said engaging cap to said engaging member, said object engaging section configured to support the object on the surface when said hook is placed on the outwardly extending edge of the surface, said display clip is in said locked position with said outwardly extending member through the mounting aperture of the object and the object positioned between said front surface of said base and said engaging cap.

11. The display clip of claim 10, wherein said engaging cap has a cap aperture sized and configure to receive and lockedly engage said outwardly projecting member to secure said display clip in said locked position.

12. The display clip of claim 11, wherein said outwardly projecting member has a narrower section at said proximal end thereof and an enlarged section at said distal end thereof, said narrower section sized and configured to receive said cap aperture of said engaging cap after said enlarged section of said outwardly projecting member has passed through said cap aperture, said enlarged section cooperatively sized and configured with said cap aperture to prevent said display clip from inadvertently moving to an unlocked position having said engaging cap disengaged from said outwardly projecting member.

13. The display clip of claim 10, wherein said mounting strap has a strap base with a base aperture therethrough, said strap base sized and configured to be placed over said outwardly projecting member with said outwardly extending member extending through said base aperture with said distal end thereof in spaced apart relation to said strap base so as to removably attach said mounting strap to said edge engaging section.

14. The display clip of claim 10 further comprising a connecting slot disposed between and interconnecting adjacent said positioning apertures, said connecting slot sized and configured to allow said outwardly engaging member to move between one or more of said positioning apertures.

15. The display clip of claim 14, wherein said outwardly projecting member has a narrower section at or near said proximal end thereof and an enlarged section at or near said distal end thereof, said outwardly projecting member and said connecting slot being cooperatively sized and configured for said connecting slot to tightly engage said narrower section and to prevent passage of said enlarged section through said connecting slot.

16. An object mounting system, comprising:
an object having a mounting aperture;
a surface having an outwardly extending edge; and
a display clip for removably mounting said object to said outwardly extending edge of said surface, said display clip having an edge engaging section and an object engaging section, said edge engaging section comprising a base and a hook, said base having a front surface, back surface, a first end, a second end and a plurality of positioning apertures disposed between said first end and said second end, said hook attached to or integral with said first end of said base so as to extend outwardly from said base and define an edge engaging gap that is sized and configured for said hook to be positioned over said outwardly extending edge of said surface, said object engaging section having an engaging member, an engaging cap and a mounting strap, said engaging member having an outwardly projecting member with a proximal end attached to or integral with a back panel and a distal end extending outward from said back panel, said outwardly projecting member sized and configured to pass through said mounting apertures of said object so as to dispose said distal end of said outwardly projecting member in spaced apart relation to said front surface of said base when said outwardly projecting member is received through one of said plurality of positioning apertures with said back panel at said back surface of said base, said engaging cap having a cap aperture sized and configured to engagedly receive said distal end of said outwardly projecting member so as to place said display clip in a locked position, said mounting strap attached to or integral with said engaging cap, said object engaging section configured to support said object on said surface when said hook is over said outwardly extending edge of said surface and said display clip is in said locked position with said mounting aperture of said object disposed on said outwardly projecting member between said base and said engaging cap.

17. The object mounting system of claim 16, wherein said mounting strap has a strap base with a base aperture therethrough, said strap base sized and configured to be placed over said outwardly projecting member with said outwardly extending member extending through said base aperture to position said distal end thereof in spaced apart relation to said strap base so as to removably attach said mounting strap and said engaging cap to said edge engaging section.

18. The object mounting system of claim 16 further comprising a connecting slot disposed between and interconnecting adjacent said positioning apertures, said connecting slot sized and configured to allow said outwardly engaging member to move between one or more of said positioning apertures.

19. The object mounting system of claim 18, wherein said outwardly projecting member has a narrower section at or near said proximal end thereof and an enlarged section at or near said distal end thereof, said outwardly projecting member and said connecting slot being cooperatively sized and configured for said connecting slot to tightly engage said narrower section and to prevent passage of said enlarged section through said connecting slot.

20. The mounting system of claim 16 further comprising a vehicle having a gap associated with said outwardly extending edge of said surface, said surface moveable between an open condition and a closed condition, said hook having a curved member sized and configured to be positioned at said outwardly extending edge when said surface is in an open position and to be received in said gap so as to secure said display clip to said vehicle when said surface is in said closed condition to position said object on said vehicle with a back side of said object generally at or against said surface with a front side of said object facing away from said vehicle when said display clip is in said locked position.

* * * * *